US010239385B2

(12) United States Patent
Shibata et al.

(10) Patent No.: US 10,239,385 B2
(45) Date of Patent: Mar. 26, 2019

(54) AIR CONDITIONING REGISTER

(71) Applicant: TOYODA GOSEI CO., LTD., Kiyosu-shi, Aichi-ken (JP)

(72) Inventors: Minoru Shibata, Kiyosu (JP); Hiromi Nagai, Kiyosu (JP); Nobuhiro Terai, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 12 days.

(21) Appl. No.: 15/593,923

(22) Filed: May 12, 2017

(65) Prior Publication Data

US 2017/0334266 A1    Nov. 23, 2017

(30) Foreign Application Priority Data

May 17, 2016   (JP) .................................. 2016-098820

(51) Int. Cl.
   *B60H 1/34*   (2006.01)

(52) U.S. Cl.
   CPC ..... *B60H 1/345* (2013.01); *B60H 2001/3478* (2013.01)

(58) Field of Classification Search
   CPC .. B60H 1/3414; B60H 1/3421; B60H 1/3428; B60H 1/3435; B60H 1/3442; B60H 1/345; B60H 2001/3471; B60H 2001/3478
   USPC ........................................ 454/143, 152, 155
   See application file for complete search history.

(56) References Cited

U.S. PATENT DOCUMENTS

| | | | | |
|---|---|---|---|---|
| 5,063,833 A * | 11/1991 | Hara | ...................... | B60H 1/345 454/152 |
| 5,470,276 A * | 11/1995 | Burnell | .................. | B60H 1/345 454/155 |
| 6,800,023 B2 * | 10/2004 | Demerath | ............... | F24F 13/15 454/155 |
| 6,893,338 B2 * | 5/2005 | Katagiri | ............... | B60H 1/3421 454/155 |
| 7,018,288 B2 * | 3/2006 | Okada | .................. | B60H 1/3421 454/155 |
| 7,455,581 B2 * | 11/2008 | Gehring | ............... | B60H 1/3428 454/155 |

(Continued)

FOREIGN PATENT DOCUMENTS

JP     2002-293133 A     10/2002
JP     2002293133 A   * 10/2002 ........... B60H 1/3421

*Primary Examiner* — Steven B McAllister
*Assistant Examiner* — Ko-Wei Lin
(74) *Attorney, Agent, or Firm* — Posz Law Group, PLC

(57) ABSTRACT

An air conditioning register includes: a retainer, fins, a connecting plate and a drive mechanism; wherein: connecting pins of the fins are engaged with cam grooves provided in the connecting plate so that all fins are connected to the connecting plate, wherein: each of the cam grooves has a parallel blowing zone for bring adjacent fins into a parallel blowing mode, and has a diffusion blowing zone for bringing adjacent fins into a diffusion blowing mode; and the drive mechanism is provided with an allowing part which allows the connecting plate to move in the arrangement direction of the fins, while maintaining the zone where each connecting pin is positioned in each cam chamber in the parallel blowing zone, when the operation of tilting the fins is performed with the fin shafts as a fulcrum, and only when each connecting pin is in the parallel blowing zone.

6 Claims, 15 Drawing Sheets

(56) References Cited

U.S. PATENT DOCUMENTS

| | | | | |
|---|---|---|---|---|
| 7,997,964 | B2* | 8/2011 | Gehring | B60H 1/345 454/152 |
| 8,109,813 | B2* | 2/2012 | Sakakibara | B60H 1/3414 454/143 |
| 2004/0203334 | A1* | 10/2004 | Shibata | B60H 1/3428 454/155 |
| 2005/0239391 | A1* | 10/2005 | Shibata | B60H 1/3421 454/155 |
| 2006/0073781 | A1* | 4/2006 | Mochizuki | B60H 1/3421 454/152 |
| 2009/0181611 | A1* | 7/2009 | Hollender | F24F 13/1426 454/333 |
| 2010/0120347 | A1* | 5/2010 | Gehring | B60H 1/345 454/155 |
| 2013/0149952 | A1* | 6/2013 | Demerath | B60H 1/3421 454/155 |
| 2014/0120826 | A1* | 5/2014 | Takai | F24F 13/075 454/318 |
| 2014/0199933 | A1* | 7/2014 | Wissmueller | B60H 1/249 454/162 |
| 2015/0065031 | A1* | 3/2015 | Shibata | B60H 1/3421 454/322 |
| 2017/0305238 | A1* | 10/2017 | Brinas | B60H 1/00564 |

* cited by examiner

AIR CONDITIONING REGISTER

CROSS-REFERENCE TO RELATED APPLICATION(S)

This application is based upon and claims the benefit of priority from Japanese Patent Application No. 2016-098820, filed on May 17, 2016, the entire contents of which are incorporated herein by reference.

BACKGROUND

1. Field of the Invention

The present invention relates to an air conditioning register for blowing air conditioning air sent from an air conditioner through a blowout port of an air passage.

2. Description of the Related Art

An air conditioning register for changing the direction of air conditioning air sent from an air duct of an air conditioner and blown into a vehicle is incorporated into an instrument panel of the vehicle. It is know that one form of the air conditioning register includes a retainer having an air passage through which the air conditioning air flows, and a plurality of fins arranged in the air passage and supported by fin shafts to be tiltable relative to the retainer respectively.

Each fin has a connecting pin at a position deviated from the fin shaft. Further, the connecting pins of the fins arranged in parallel to each other are connected by a connecting link. Therefore, all the fins are tilted while maintaining parallel to each other. The air conditioning air flows between the adjacent fins or the like, toward the direction along the same fins which are in parallel with each other, and blows out from the blowout port from the blowout port. The blowing mode in which the air conditioning air blows out in this manner is called a parallel blowing mode.

Furthermore, in recent years, in addition to the parallel blowing mode, an air conditioning register capable of blowing air conditioning air from the blowout port in a diffusion blowing mode has been considered (for example, refer to JP-A-2002-293133). In the diffusion blowing mode, adjacent fins are tilted such that the interval between the upstream ends of the adjacent fins becomes narrower than the interval between the downstream ends, in this case, the air conditioning air diffuses to spread over a wider area at the downstream side by flowing between the adjacent fins or the like along the same fins. A weaker air conditioning air is blown to a wider site of the occupant than when the parallel blowing mode is selected as the blowing mode.

To realize the diffusion blowing mode, a guiding link is used in addition to the connecting link in JP-A-2002-293133. The connecting link is provided with the same number of supporting holes as the fins, and the guiding link is formed with the same number of guiding holes as the fins. A connecting pin each fin is engaged with an intersection portion of the supporting hole and the guiding hole.

Therefore, when the guiding link is moved in the flowing direction of the air conditioning air, the relative position between the guiding link and the connecting link changes. Thereby, the position of the intersection portion of the supporting hole and the guiding hole changes, the fins tilt, and the blowing mode changes from the parallel blowing mode to the diffusion blowing mode, or vice versa, from the diffusion blowing mode to the parallel blowing mode.

Furthermore, when the guiding link and the connecting link are raised and lowered under the parallel blowing mode, the fins are tilted when parallel to each other, and the direction of air conditioning air blown out in parallel is changed.

Although not directly described in JP-A-2002-293133, it is conceivable to raise and lower the guiding link and the connecting link under the diffusion blowing mode. In this case, the plurality of fins in such a relationship that the distance between the fins increases at the downstream side are tilted to the adjacent fin while the relationship is maintained, and the direction in which the diffused air conditioning air changes is changed. By doing this, it is possible to change the site of the passenger where the diffused air conditioning air is blown.

However, in this case, among the plurality of fins set in the diffusion blowing mode, when the one positioned at the end is tilted in the same diffusion blowing mode, it is necessary to avoid hitting the opposing wall surfaces in the fin arrangement direction of the retainer. For this purpose, the inclination of the fins in the diffusion blowing mode is reduced, but the range of the diffused air conditioning air becomes narrow.

SUMMARY

The present invention has been made in view of such circumstances, and an object of the present invention is to provide an air conditioning register capable of widening the range of the air conditioning air diffused in the diffusion blowing mode.

According to an aspect of the present invention, there is provided an air conditioning register, including: a retainer which is formed with an air passage having a blowout port at a downstream end in a flowing direction of air conditioning air; a plurality of fins arranged in a direction intersecting with the flowing direction in the air passage, tiltably supported in the retainer respectively by fin shafts, and having connecting pins respectively at positions deviated from the fin shafts; a connecting plate configured to connect the plurality of fins at the connecting pins; a drive mechanism configured to change a position of the connecting plate in the flowing direction, wherein: the connecting pins of the fins are engaged with cam grooves provided in the connecting plate so that all the fins are connected to the connecting plate; each of the cam grooves has a parallel blowing zone for bring adjacent fins into a parallel blowing mode in which the adjacent fins are parallel to each other, and has a diffusion blowing zone for bringing adjacent fins into a diffusion blowing mode in which the interval between the upstream ends of the adjacent fins is narrower than the interval between the downstream ends; and the drive mechanism is provided with an allowing part which allows the connecting plate to move in the arrangement direction of the fins, while maintaining the zone where each connecting pin is positioned in each cam chamber in the parallel blowing zone, when the operation of tilting the fins is performed with the fin shafts as a fulcrum, and only when each connecting pin is in the parallel blowing zone.

According to the above configuration, when the operation of tilting the fins with the fin shaft as the fulcrum is performed, the allowing part of the drive mechanism allows the connecting plate to move in the arrangement direction of the fins, while maintaining the zone where the connecting pins are positioned in the cam grooves in the parallel blowing zone, only when the connecting pins are in the parallel blowing zone.

Therefore, when the parallel blowing mode is set as the blowing mode, and when the operation of tilting the fins with the fin shafts as the fulcrum is performed, while the connecting pins are maintained in the parallel blowing zone of the cam grooves, the connecting plate moves in the arrangement direction of the fins. The fins are tilted while parallel to each other, and the direction of the air conditioning air blown out in parallel from the blowout port is changed.

On the other hand, when the diffusion blowing mode is set as the blowing mode, even if the operation of tilting the fins around the fin shafts is performed, each connecting pin is maintained in the diffusion blowing zone of the cam groove while the connecting plate is not allowed to move in the arrangement direction of the fins. The adjacent fins can not tilt while maintaining that the interval between the upstream ends is narrower than the interval between the downstream ends, and will not change the direction of the diffused air conditioning air.

Therefore, as compared with the case where the fins are tilted while maintaining the diffusion blowing mode, in the plurality of fins set in the diffusion blowing mode, those positioned at the end can be close to the wall surfaces opposed to each other in the arranging direction of the fins in the retainer. Due to this closing, the range of the diffused air conditioning air becomes wider than when the fins are tilted while maintaining the diffusion blowing mode.

In the air conditioning register of the present invention, the drive mechanism may include: an operation member configured to change a blowing mode of the plurality of fins between the parallel blowing mode and the diffusion blowing mode by changing a position of the connecting plate in the flowing direction; and a pair of gears arranged along the arrangement direction of the fins, meshing with each other and rotating in opposite directions in accordance with the operation of the operation member, the allowing part may include: a pair of guiding holes respectively extending in the arrangement direction of the fins in the connecting plate; and a pair of guiding projections provided at positions deviated from the rotation centers of the gears and engaged with the guiding holes, and the allowing part may regulate the connecting plate from moving in the arranging direction of the fins, only when the plurality of fins are brought into the diffusion blowing mode by the operation member, by positioning both the guiding projections in the position most distant from the other guiding hole in the guiding holes.

According to the above configuration, when the operation member is operated to switch the blowing mode between the parallel blowing mode and the diffusion blowing mode, the pair of gears rotate in opposite directions according to the operation. With this rotation, the guiding projection of each gear pivots in opposite directions around the rotation center of the same gear. With this pivoting, the positions of the guiding projections in the guiding holes extending in the arranging direction of the fins are changed, so that the two guiding projections move toward and away from each other, and the connecting plate moves in the flowing direction.

When the blowing mode is set to the diffusion blowing mode by the operation member, the two guiding projections are most distant from each other and are positioned at the positions furthest from the other guiding hole in the respective guiding hole. Therefore, the movement of the connecting plate in the extending direction of the guiding holes, that is the arrangement direction of the fins, is regulated by the two guiding projections.

Therefore, even when the diffusion blowing mode is set as the blowing mode, and the operation of tilting the fins with the fin shaft as the fulcrum is performed, each connecting pin is held in the diffusion blowing zone of the cam groove while the connecting plate is not allowed to move in the arrangement direction of the fins.

Further, when the blowing mode is set to the parallel blowing mode by the operation member, at least one of the guiding projections is positioned in a position different from the above diffusion blowing mode, in the two guiding holes. The movement regulation is not made by the two guiding projections, and the connection plate is allowed to move in the arranging direction of the fins. Therefore, in the parallel blowing mode, when the operation of tilting the fins with the fin shaft as a fulcrum is performed, the connecting plate moves in the arranging direction of the fins while the connecting pins are held in the parallel blowing zone of the cam grooves.

In the air conditioning register of the present invention, the operation member may be rotatably supported by the retainer, in one of the gears, a transmission shaft is provided at a position deviated from both the rotation center of the gear and the guiding projection, an engaged part to which the transmission shaft is engaged may be provided at a position deviated from the rotation center of the operation member, and the switching of the blowing mode between the parallel blowing mode and the diffusion blowing mode may be performed by transmitting the rotation of the operation member to the one gear through the engaged part and the transmission shaft.

According to the above configuration, when the operation member is rotated, the rotation is transmitted to the one gear through the engaged part the transmission shaft, and the same gear is rotated. With this rotation, the position where the other gear meshes with the one gear changes, and the other gear rotates in the direction opposite to the one gear. With the above rotation, the guiding projection of each gear pivots around the rotation center of the same gear. With this pivoting, the positions of the guiding projections in the guiding holes extending in the arranging direction of the fins are changed, so that the two guiding projections move toward and away from each other, and the connecting plate moves in the flowing direction.

In the air conditioning register of the present invention, in the retainer, a shut damper configured to adjust the opening degree of the air passage may be tiltably supported by a damper shaft, and a transmission mechanism configured to transmit the rotation of the operation member to the damper shaft may be provided between the operation member and the damper shaft.

According to the above configuration, when the operation member is rotated, the rotation is transmitted to the shut damper through the transmission mechanism and the damper shaft. With this transmission, the shut damper tilts around the damper shaft as a fulcrum, and the opening degree of the air passage is adjusted. The amount of the air conditioning air blown out from the blowout port of the retainer is adjusted.

In this way, in addition to switch the blowing mode and to allow the change of the blowing direction of the air conditioning air A1 in the parallel blowing mode, by rotating the single operation member, it is possible to adjust the opening degree of the air passage by driving the shut damper.

In the air conditioning register of the present invention, the transmission mechanism may include a link member arranged to be movable in the flowing direction, an upstream end of the link member may be connected to a position deviated from the rotation center of the damper shaft, and a downstream end of the link member may be connected to a position deviated from both the rotation center of the operation member and the engaged part.

According to the above configuration, when the operation member is rotated and the downstream end of the link member pivots around the rotation center of the operation member, the link member moves in the flowing direction of the air conditioning air. Accordingly, the position of the upstream end of the link member in the flowing direction changes, and the shut damper is tilted around the damper shaft as a fulcrum. In this way, the rotation of the operation member is transmitted to the shut damper through the link member, and the shut damper is tilted.

In the air conditioning register of the present invention, when the transmission shaft of the gear is a first transmission shaft and the engaged part to which the first transmission shaft is engaged in the operation member is a first engaged part, a second transmission shaft may be provided at a downstream end of the link member, a second engaged part to which the second transmission shaft is engaged may be provided at a position deviated from both the rotation center and the first engaged part of the operation member, the first engaged part may be formed of a groove part or an elongated hole, and may have a first transmission zone for transmitting the rotation of the operation member to the first transmission shaft and a first non-transmission zone not transmitting, the second engaged part may be formed of a groove part or an elongated hole, and may have a second transmission zone for transmitting the rotation of the operation member to the second transmission shaft and a second non-transmission zone not transmitting, and the second transmission shaft may be positioned in the second non-transmission zone when the first transmission shaft is positioned in the first transmission zone, and may be positioned in the second transmission zone when the first transmission shaft is positioned in the first non-transmission zone.

According to the above configuration, when the operation member is rotated, the first engaged part the second engaged part pivot around the rotation center of the operation material. By this pivoting, the position of the first transmission shaft of the first engaged part and the position of the second transmission shaft of the second engaged part change.

When the first transmission shaft is positioned in the first transmission zone of the first engaged part, the second transmission shaft is positioned in the second non-transmission zone of the second engaged part. Therefore, the rotation of the operation member is transmitted to the first transmission shaft, and switching of the blowing mode of the plurality of fins is performed by the rotation of the two gears and the movement of the connecting plate in the flowing direction. At this time, the rotation of the operation member is not transmitted to the second transmission shaft. The link member does not move, the shut damper does not tilt, and the opening degree of the air passage is not adjusted.

On the other hand, when the first transmission shaft is positioned in the first non-transmission zone of the first engaged part, the second transmission shaft is positioned in the second transmission zone of the second engaged part. Therefore, the rotation of the operation member is not transmitted to the first transmission shaft, and the two gears are not rotated. The connecting plate does not move in the flowing direction, and switching of the blowing mode of the plurality of fins is not performed. At this time, the rotation of the operation member is transmitted to the second transmission shaft, and the link member is moved. The shut damper is tilted to adjust the opening degree of the air passage.

In the air conditioning register of the present invention, the zone, where the first transmission shaft is positioned in the first transmission zone when the blowing mode is the parallel blowing mode, may be connected to the first non-transmission zone through the zone, where the first transmission shaft is positioned in the diffusion blowing mode, and the zone, where the second transmission shaft is positioned in the second transmission zone when the opening degree of the air passage is the minimum, may be connected to the second non-transmission zone through the zone, where the second transmission shaft is positioned when the opening degree is the maximum.

According to the above configuration, when the blowing mode is set to the parallel blowing mode by the rotation operation of the operation member, the first transmission shaft is positioned at a position away from the first non-transmission zone in the first transmission zone. In addition, the second transmission shaft is positioned at a position away from the second transmission zone in the second non-transmission zone.

When the blowing mode is set to the diffusion blowing mode, the first transmission shaft is positioned at a position adjacent to the first non-transmission zone in the first transmitting zone. In addition, the second transmission shaft is positioned at a position adjacent to the second transmission zone in the second non-transmission zone.

Furthermore, when the blowing mode is switched from the parallel blowing mode to the diffusion blowing mode, the first transmission shaft moves from a position away from the first non-transmission zone to a position adjacent to the first non-transmission zone in the first transmission zone. In addition, the second transmission shaft moves from a position away from the second transmission zone to a position adjacent to the second non-transmission zone in the second non-transmission zone.

Conversely to the above, when the blowing mode is switched from the diffusion blowing mode to the parallel blowing mode, the first transmission shaft moves from a position adjacent to the first non-transmission zone to a position away from the first non-transmission zone in the first transmission zone. In addition, the second transmission shaft moves from a position adjacent to the first transmission zone to a position away from the second non-transmission zone in the second non-transmission zone.

Therefore, when the operation member is rotated in one direction, the blowing mode is switched from the parallel blowing mode to the diffusion blowing mode. When the operation member is rotated further in the above direction from the state in which the blowing mode is switched to the diffusion blowing mode, the shut damper is tilted in the direction to decrease the opening degree of the air passage. Accordingly, the momentum of the air conditioning air blown out from the blowout port of the retainer gradually weakens in accordance with the operation of the operation member.

In addition, when the operation member is rotated in a direction opposite to the above from a state where the opening degree of the air passage is the minimum, the shut damper is tilted in a direction to increase the opening degree of the air passage. When the operation member is rotated further in the above direction from the state where the opening degree is the maximum, the blowing mode is switched in the order of the diffusion blowing mode and the parallel blowing mode. Accordingly, the momentum of the air conditioning air blown out from the blowout port of the retainer gradually increases in accordance with the operation of the operation member.

According to the air conditioning register, it is possible to widen the range of air conditioning air diffused in a diffusion blowing mode.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 12A is a partial right side view corresponds to FIG. 10, and FIG. 12B is a partial sectional side view corresponding to FIG. 11;

FIG. 13A is a partial right side view corresponds to FIG. 10, and FIG. 13B is a partial sectional side view corresponding to FIG. 11;

FIG. 14A is a partial right side view corresponding to FIG. 10, and FIG. 14B is a partial sectional side view corresponding to FIG. 11.

DETAILED DESCRIPTION OF THE INVENTION

Hereinafter, an embodiment embodied as a vehicle air conditioning register will be described with reference to the figures.

In the following description, the traveling direction (forward direction) of a vehicle is defined as front, the backward direction is defined as back, and the height direction is defined as a vertical direction. Regarding the vehicle width direction (lateral direction), the direction is defined with reference to the case where the vehicle is viewed from the back.

In the passenger compartment, an instrument panel is provided in front of the front seats (the driver's seat and the passenger's seat) of the vehicle, and an air conditioning register is incorporated in the center part, the side parts, etc. in the lateral direction (vehicle width direction). The main function of this air conditioning register is to change the direction of the air conditioning air sent from an air conditioner and blown out into the passenger compartment from blowout openings, to adjust the blowing amount of the air conditioning air, and the like. The adjustment of the blowing amount includes blocking the blowing out.

Figure 1:
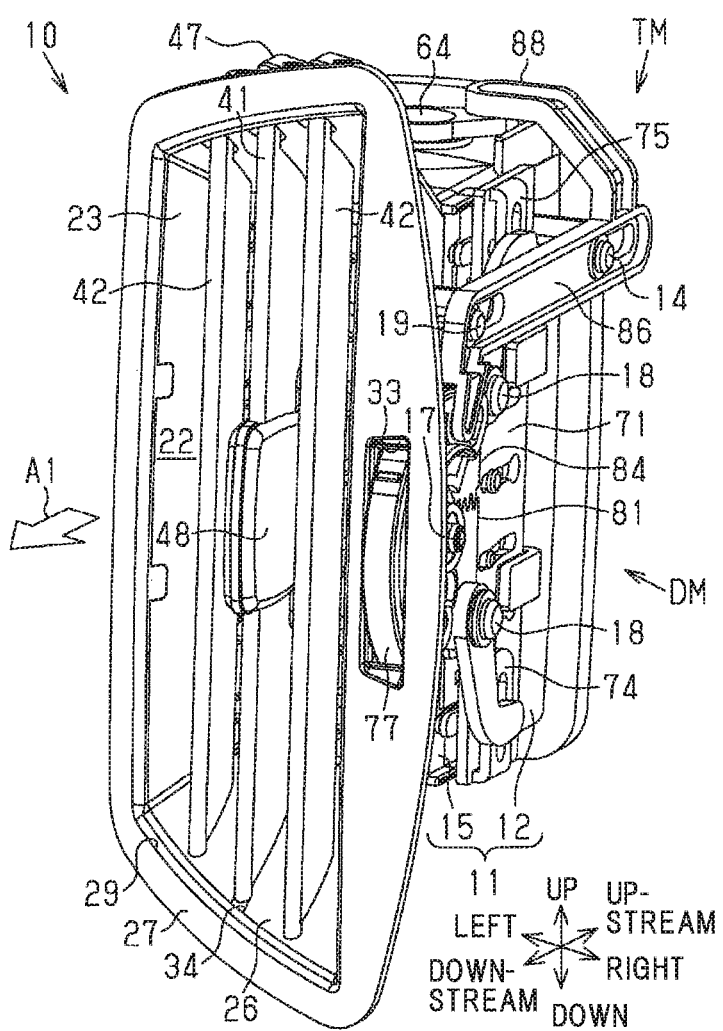
FIG. 1 is a perspective view of an air conditioning register according to one embodiment.
Figure 2:
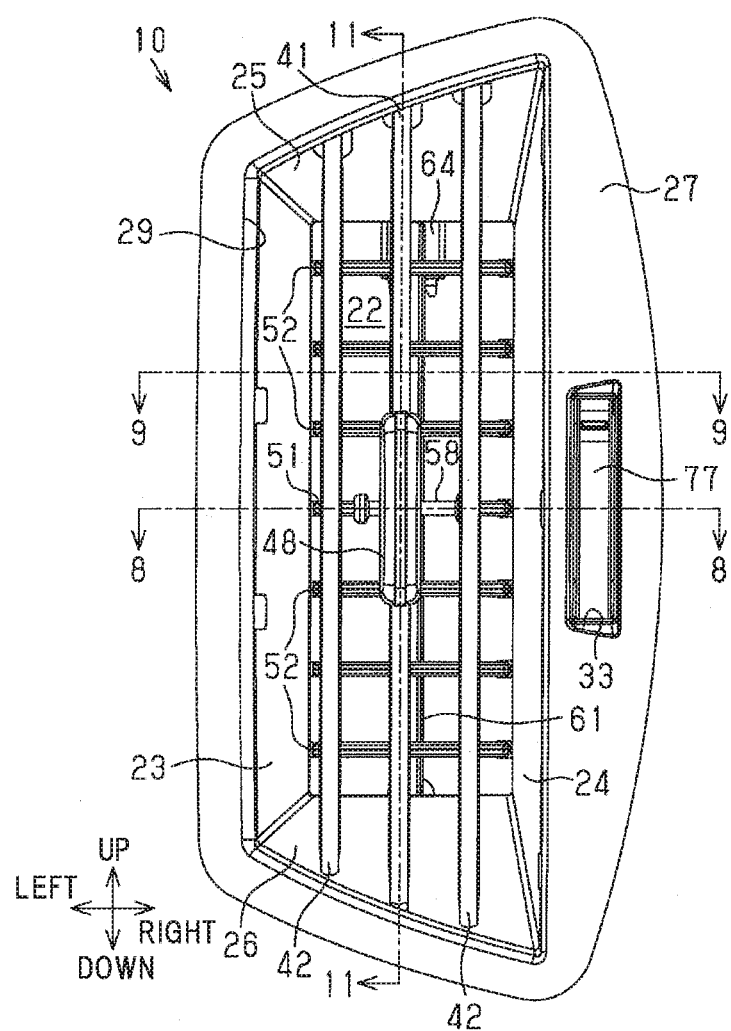
FIG. 2 is a front view of the air conditioning register of FIG. 1.

As shown in FIGS. 1 and 2, the air conditioning register includes a retainer 10, a downstream fin group, an operation knob 48, an upstream fin group, a shut damper 61, a connecting plate 71, a drive mechanism DM, and a transmission mechanism TM. Next, the configuration of the components of the air conditioning register will be described.

<Retainer 10>

The retainer 10 is used to connect a blowing tact (not shown) of the air conditioner and an opening (not shown) the instrument panel is provided with, and includes a retainer main body 11 and a bezel 27.

The internal space of the retainer 10 forms a flow path of air conditioning air A1 (hereinafter referred to as "air passage 22"). Here, with respect to the flowing direction of the air conditioning air A1, the side close to the air conditioner is referred to as "upstream", "upstream side" and the like and the side far from the air conditioner is referred to as "downstream", "downstream side" and the like.

Figure 3:
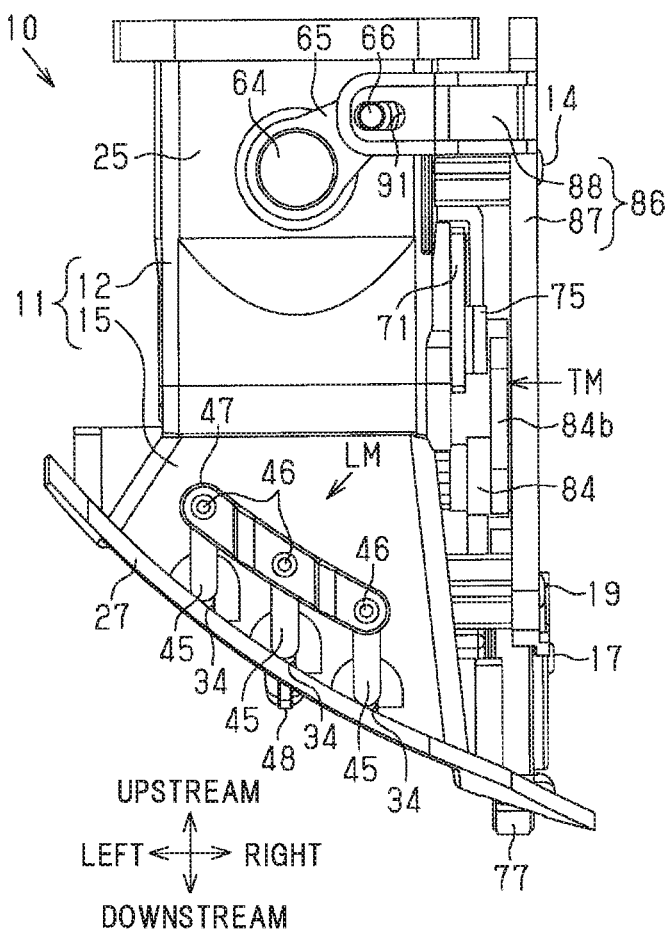
FIG. 3 is a top view of the air conditioning register of FIG. 1.
Figure 4:
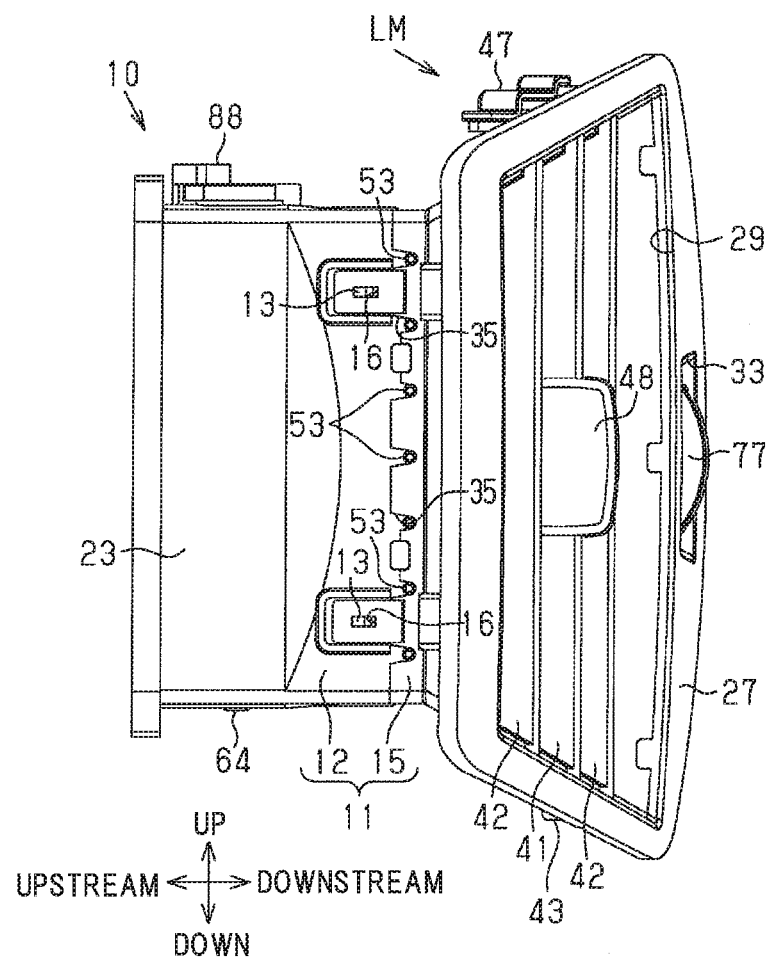
FIG. 4 is a left side view of the air conditioning register of FIG. 1.
Figure 6:
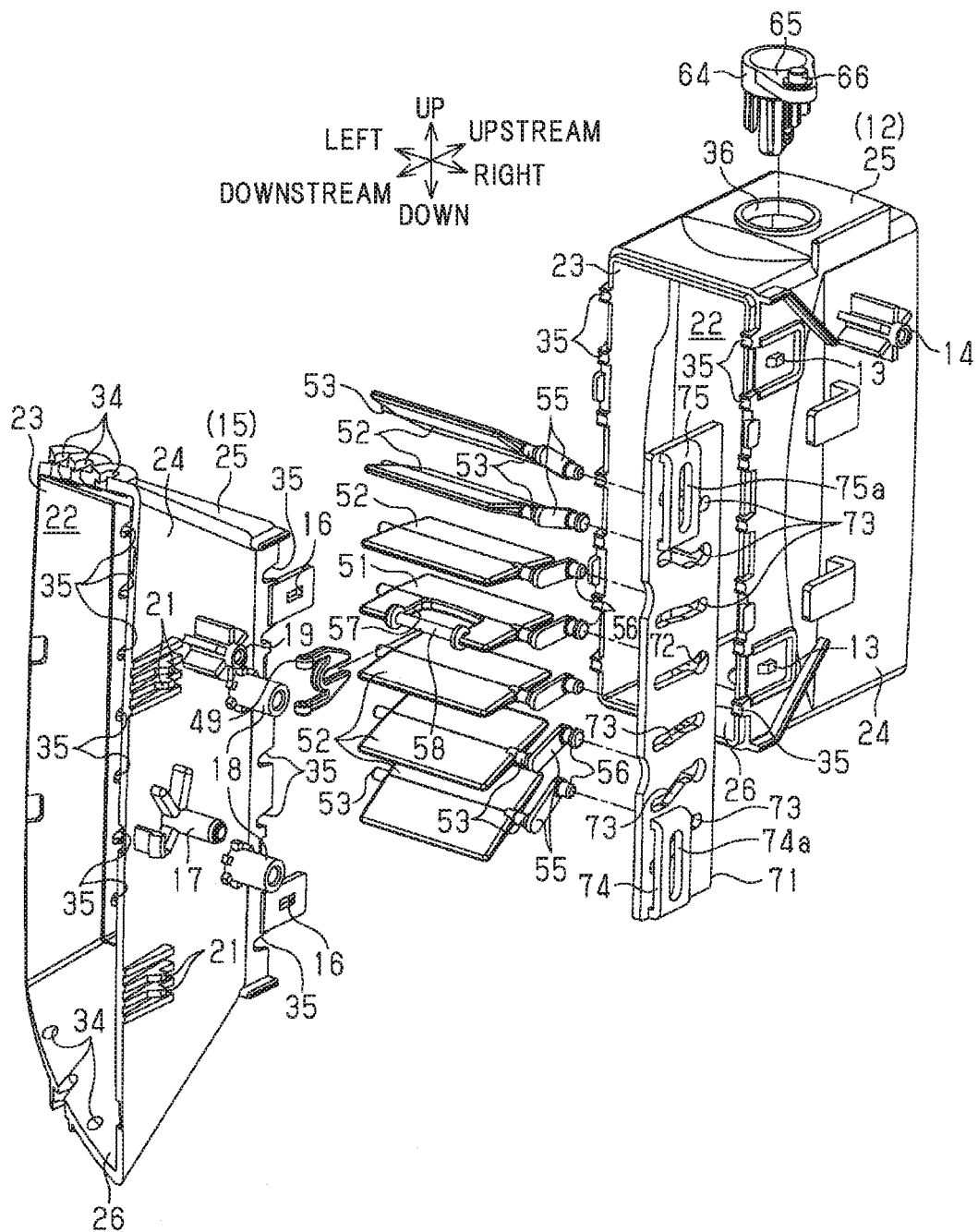
FIG. 6 is an exploded perspective view showing a part of the components of the air conditioning register in FIG. 1.

As shown in FIGS. 3, 4, and 6, the retainer main body 11 is formed of two members arranged along the flowing direction of the air conditioning air A1. In order to distinguish the two members, the one positioned on the upstream side in the flowing direction is referred to as the upstream retainer 12, and the one positioned on the downstream side is referred to as the downstream retainer 15.

The upstream retainer 12 has a vertically elongated pipe shape whose upstream end and downstream end are opened, and the vertical dimension is larger than the lateral dimension.

Like the upstream retainer 12, the downstream retainer 15 has a pipe shape whose upstream end and downstream end are opened, and the vertical dimension is larger than the lateral dimension. The downstream retainer 15 is connected to the upstream retainer 12 by locking projections 13 provided at corresponding positions of the upstream retainer 12 to locking holes 16 provided at the upstream end of the downstream retainer 15.

The air passage 22 is surrounded by four walls of the retainer main body 11. These four walls are composed of a pair of side walls 23 and 24 facing each other in the lateral direction and an upper wall 25 and a bottom wall 26 facing each other in the vertical direction. The two side walls 23 and 24 are parallel or close to each other in the upstream retainer 12. The upper wall 25 and the bottom wall 26 are parallel or close to each other in the upstream retainer 12. In the downstream retainer 15, two side walls 23 and 24 are inclined so that the interval in the lateral direction increases toward the downstream side. In the downstream retainer 15, an upper wall 25 and a bottom wall 26 are inclined so that the interval in the vertical direction increases toward the downstream side.

Figure 10:
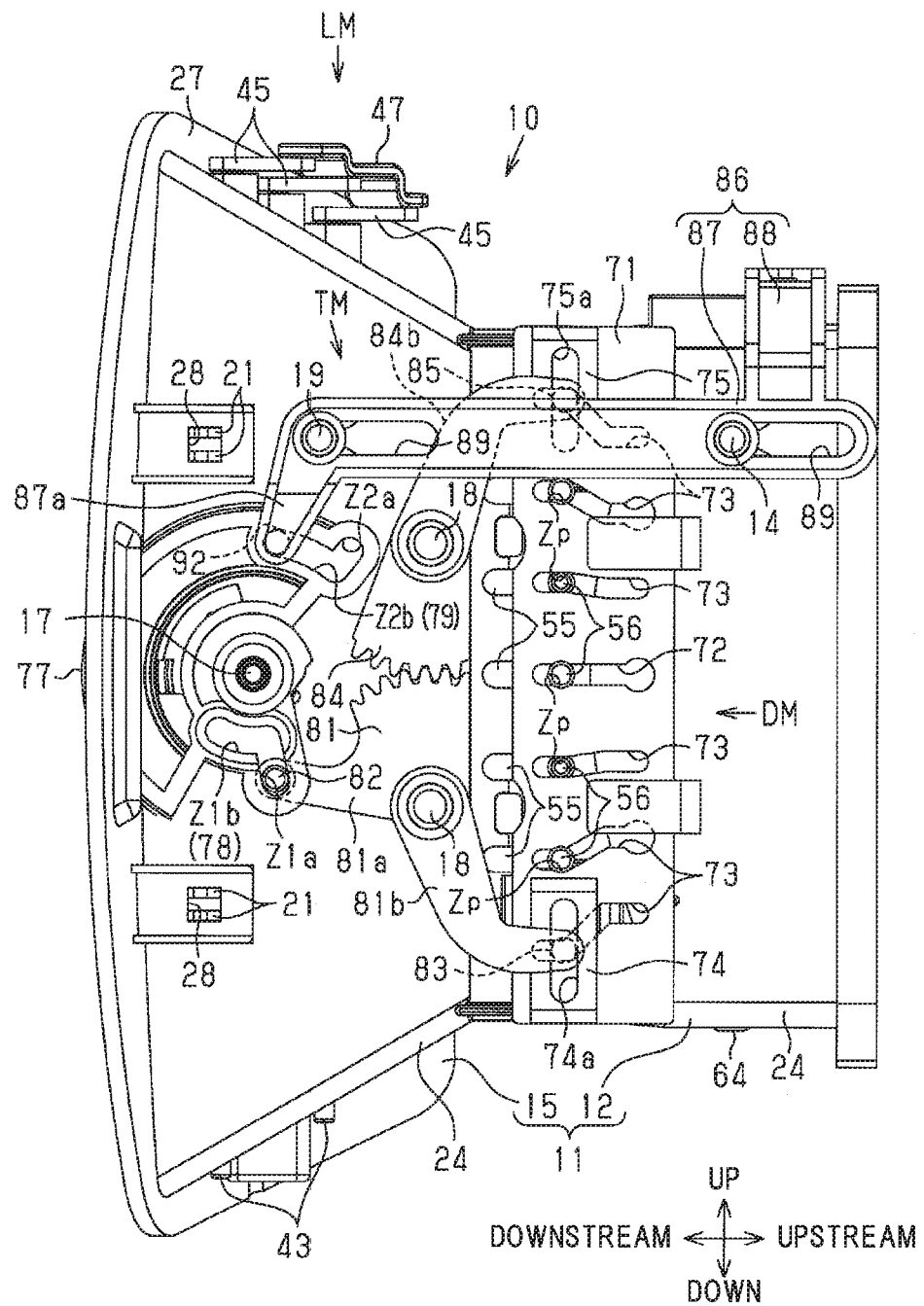
FIG. 10 is a right side view of the air conditioning register in which the opening of an air passage is maximized by a shut damper and upstream fins are in a neutral state in one embodiment.

As shown in FIGS. 6 and 10, a shaft part 17 protrudes rightward from the center portion in the vertical direction of the right side wall 24 of the downstream retainer 15. On the same side wall 24, shaft parts 18 protrude rightward respectively from two places, which are upstream parts in the flowing direction from the shaft part 17 and are spaced apart from each other in the vertical direction.

On the upper part of the right side wall 24 of the retainer main body 11, at two places spaced apart from each other in the flowing direction, guiding pins 14 and 19 protrude rightward. In this embodiment, the upstream retainer 12 is provided with one guiding pin 14, and the downstream retainer 15 is provided with the other guide pin 19.

Figure 5:
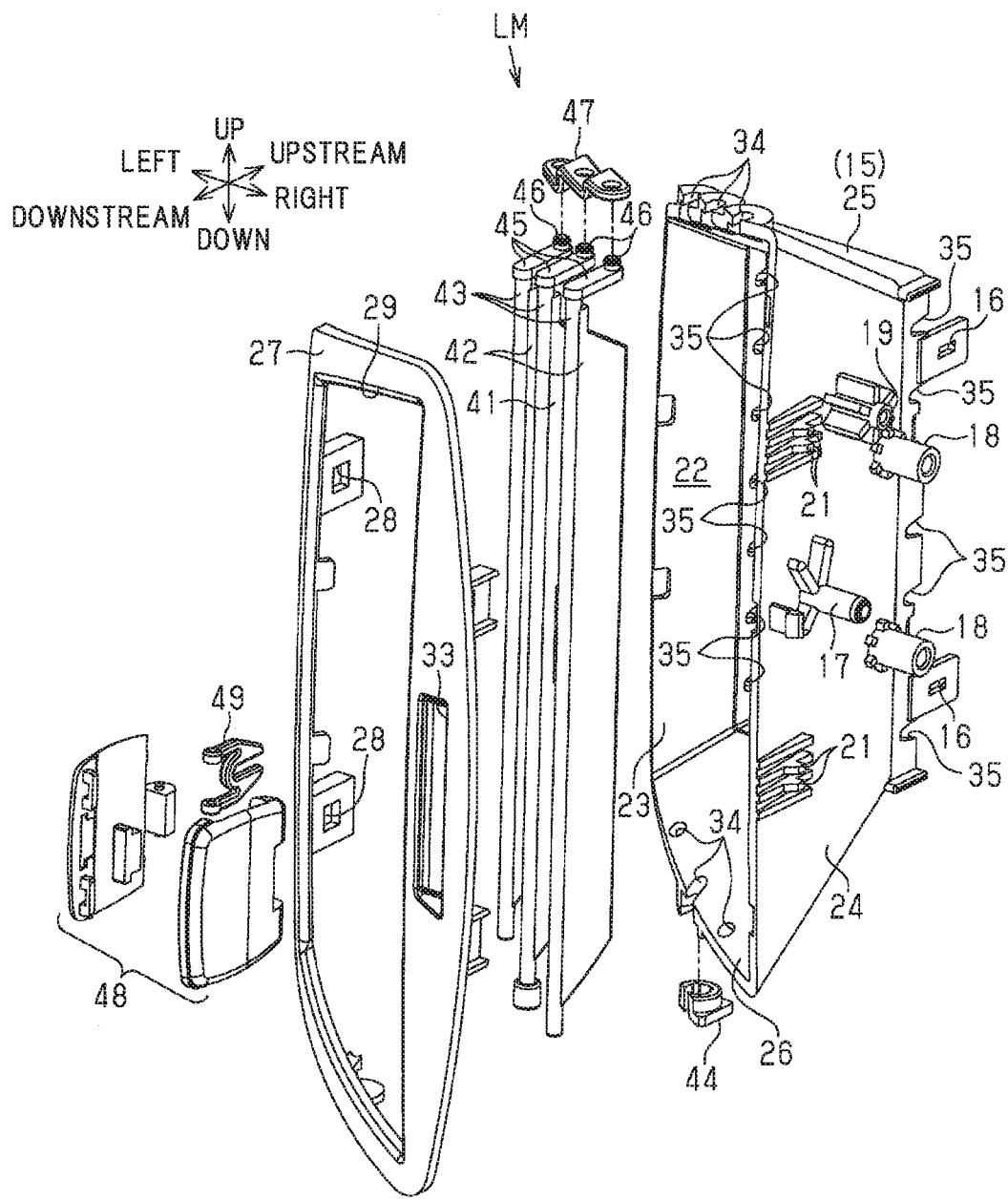
FIG. 5 is an exploded perspective view showing a part of the components of the air conditioning register in FIG. 1.

As shown in FIGS. 2 and 5, the bezel 27 is a member forming the most downstream portion of the retainer 10. The bezel 27 is connected to the retainer main body 11 by locking protrusions 21 provided at corresponding positions of the side walls 23, 24 of the downstream retainer 15 to locking holes 28 provided at a plurality of positions of the bezel 27 (refer to FIG. 10). The bezel 27 is formed with a vertically elongated blowout port 29, from which the air conditioning air A1 is blown out, at a position which is a downstream end of the air passage 22. A portion of the bezel 27 around the blowout port 29 forms a design surface of the air conditioning register. The bezel 27 is formed with a vertically elongated window 33 at a position that is spaced rightward from the blowout port 29.

Figure 11:
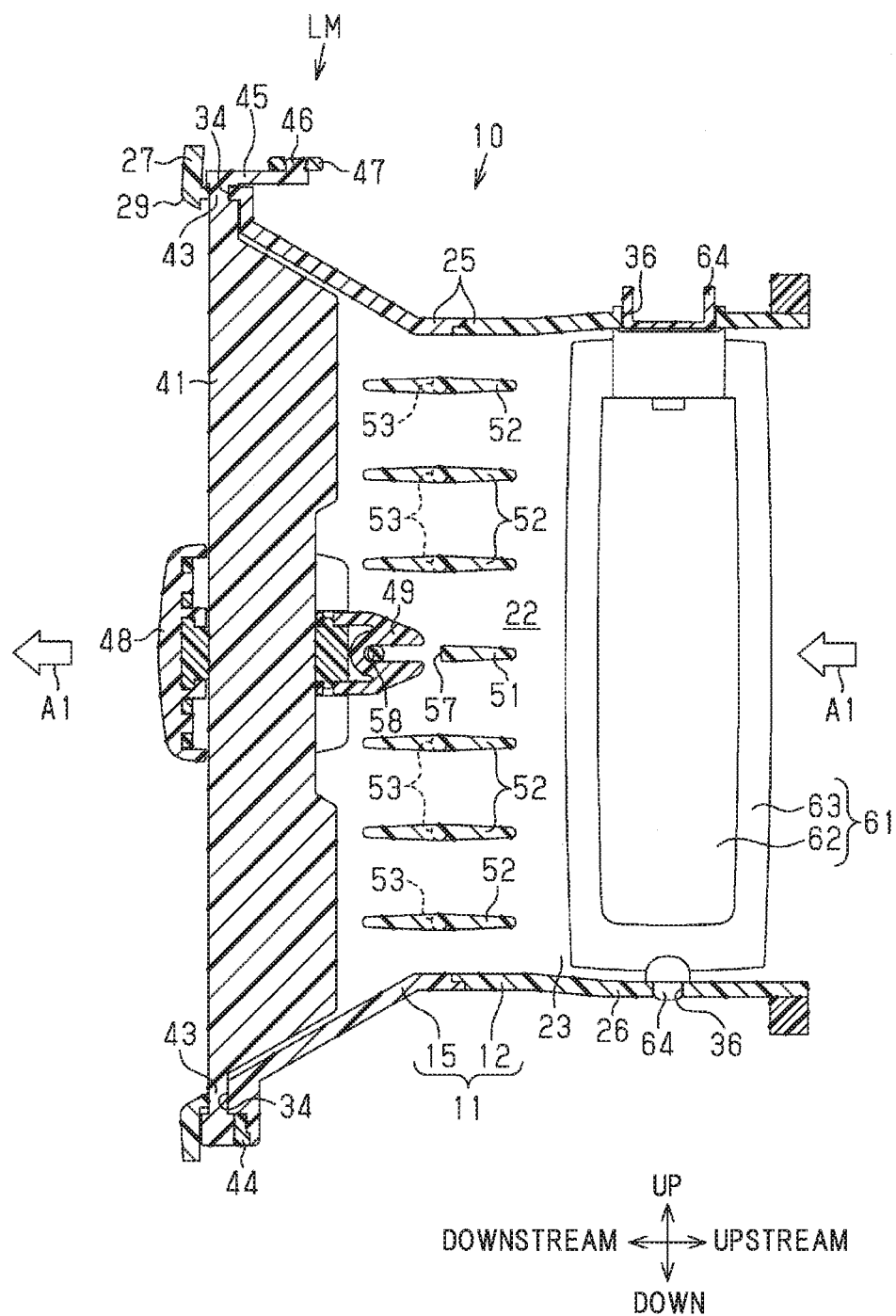
FIG. 11 is a cross-sectional view taken along the line 11-11 of FIG. 2.

As shown in FIGS. 3 and 5, and 11, shaft bearing parts 34 are respectively provided at a plurality of positions (three positions in this embodiment) spaced from each other in the lateral direction which are the boundary portions between the upper wall 25 and the bottom wall 26 of the downstream retainer 15 and the bevel 27.

As shown in FIGS. 4 and 6, shaft bearing parts 35 are provided at a plurality of positions of the boundary portions between the downstream retainer 15 and the upstream retainer 12 which are the two side walls 23, 24 of the retainer main body 11. The shaft bearing parts 35 of the side walls 23, 24 are positioned at mutually spaced positions in the vertical direction.

Further, as shown in FIGS. 6 and 11, shaft bearing parts 36 are provided at positions facing each other in the vertical direction, which are the upper wall 25 and the bottom wall 26 of the upstream retainer 12.

<Downstream Fin Group>

As shown in FIGS. 5 and 11, the downstream fin group is composed of a plurality of (three) downstream fins. The downstream fins are used to change the direction of the air conditioning air A1 blown out from the blowout port 29 in the lateral direction, and are formed into a plate shape extending in the vertical direction and the ventilation direction. The plurality of downstream fins are arranged to be substantially parallelly spaced apart from each other substantially at equal intervals in the lateral direction. In order to distinguish the three downstream fins, that positioned in the center in the lateral direction is referred to as a "downstream fin 41", and those positioned at the left and right sides are referred to as "downstream fins 42".

The downstream ends of the downstream fins 41 and 42 are provided respectively with fin shafts 43 extending in the vertical direction. The fin shafts 43 of the downstream fins 41 and 42 are supported at the downstream retainer 15 and the bezel 27 by the shaft bearing parts 34.

The lower part of the fin shaft 43 of the downstream fin 41 is elastically brought into contact with an elastic member 44 attached to the lower shaft bearing part 34. By this type of contact, when the downstream fin 41 is tilted, a sliding resistance is generated between the elastic member 44 and the fin shaft 43, and an appropriate load is applied.

The fin shafts 43 of the downstream fins 41 and 42 are exposed upward from the upper wall 25. An arm 45 is formed at a portion of each of the fin shafts 43 exposed from the upper wall 25. Each arm 45 extends upstream with the fin shaft 43 as a starting point, and has a connecting pin 46 at the extended end of the arm 45.

These connecting pins 46 mechanically connect the downstream fin 41 and the two downstream fins 42 by the connecting pins 46, which are connected to each other by a corrugated plate-like connecting member 47, and the connecting member 47, and form a link mechanism LM that tilts in synchronization with the downstream fins 41 so that the two downstream fins 42 are inclined in the same inclination as that of the downstream fin 41.

<Operation Knob 48>

The operation knob 48 is a member operated by the occupant when changing the direction of the air conditioning air A1 blown out from the blow-out port 29, and is externally fitted to the downstream fin 41. The operation knob 48 can tilt in the lateral direction with the fin shaft 43 as a fulcrum, together with the downstream fin 41, and can be displaced in the vertical direction by sliding on the downstream fin 41.

A bifurcated fork part 49 extending toward the upstream side in the flowing direction is supported to be tiltable in the lateral direction at the operation knob 48. The fork part 49 is used to transmit vertical movement (sliding) of the operation knob 48 to an upstream fin 51 to be described later.

<Upstream Fin Group>

As shown in FIGS. 6 and 11, the upstream fin group is composed of a plurality of (seven) upstream fins arranged on the upstream side in the ventilation direction from the downstream fin group in the air passage 22. Each upstream fin is used to change the direction of the air conditioning air A1 blown out from the blowout port 29 in the vertical direction, and is formed into a plate shape extending in the lateral direction and the ventilation direction. The plurality of upstream fins are arranged to be separated from each other in the vertical direction. Here, in order to distinguish the plurality of upstream fins, that positioned at the center in the vertical direction is referred to as an "upstream fin 51", and the other ones are referred to as "upstream fins 52".

Fin shafts 53 extending in the same direction are respectively provided on both end surfaces of the upstream fins 51, 52 in the lateral direction. The fin shafts 53 are positioned in the middle portion of the upstream fins 51 and 52 in the ventilation direction. The left and right fin shafts 53 of the upstream fins 51, 52 are supported by the shaft bearing parts 35 to be tillable relative to the two side walls 23, 24.

The right fin shafts 53 of the upstream fins 51, 52 project rightward from the right side wall 24. Arms 55 are formed at the distal ends of these projecting fin shafts 53, respectively. Each arm 55 extends upstream in the ventilation direction from the fin shaft 53 as a starting point, and has a connecting pin 56 at the extended end of the arm 55.

Unlike the other upstream fins 52, the upstream fin 51 has a cutout part 57 and a transmission shaft part 58. The cutout part 57 is positioned at the downstream part of the upstream fin 51 in the flowing direction of the air conditioning air A1. In addition, the cutout part 57 is positioned in the center portion of the upstream fin 51 in the lateral direction. The transmission shaft part 58 extends in the lateral direction at the downstream end of the cutout part 57, and is installed between right and left wall surfaces of the cutout part 57. The transmission shaft part 58 is sandwiched from above and below by the fork part 49 of the operation knob 48. Therefore, when the operation knob 48 is slid upward and downward along the upstream fin 51 in the center, a force in the same direction is applied to the upstream fin 51 through the fork part 49 and the transmission shaft part 58, and the upstream fin 51 is tilted in the same direction around the fin shaft 53 as a fulcrum.

<Shut Damper 61>

Figure 8:
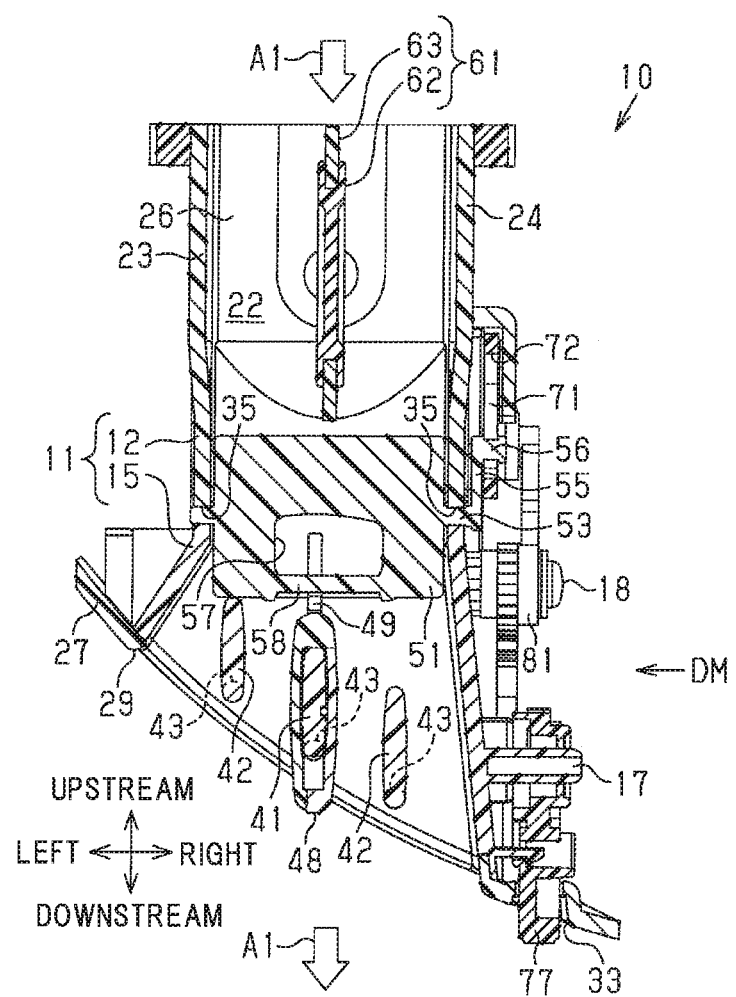
FIG. 8 is a cross-sectional view taken along the line 8-8 of FIG. 2.

As shown in FIGS. 8 and 11, the shut damper 61 is used to adjust the opening degree of the air passage 22 at the upstream side of the upstream fin group in the retainer 10. The shut damper 61 includes a damper plate 62 which has a rectangular plate shape and is longer in the vertical direction than in the lateral direction, and a sealing member 63 mounted around the damper plate 62. On the two upper and lower ends of the damper plate 62, damper shafts 64 are provided. The shut damper 61 is supported on the upper wall 25 and the bottom wall 26 by the two shaft bearing parts 36 of the two damper shafts 64. As shown in FIG. 3, the upper damper shaft 64 has a projecting part 65 projecting radially outward above the upper wall 25. The projecting part 65 has a transmission shaft part 66 extending upward at the projecting end of the projecting part 65.

<Connecting Plate 71>

As shown in FIGS. 6 and 10, the connecting plate 71 connects all the upstream fins 51 and 52 at the connecting pins 56 of the upstream fins 51 and 52. The connecting plate 71 has a shape of an elongated plate in the vertical direction, and is arranged at a position slightly spaced to the right from the right side wall 24 of the upstream retainer 12.

In the connecting plate 71, the same number (seven) of cam grooves as the upstream fins 51 and 52 are provided in a row in the vertical direction. In order to distinguish the seven cam grooves, what is positioned in the central part in the arrangement direction (vertical direction) is referred to as a "cam groove 72", and the other ones are referred to as "cam grooves 73". The connecting pin 56 of the upstream fin 51 is engaged with the cam groove 72 and the connecting pins 56 of the upstream fins 52 are engaged with the corresponding cam grooves 73 so that all the upstream fins 51 and 52 have been connected to the connecting plate 71.

The cam groove 72 has a linear shape extending in the flowing direction of the air conditioning air A1. The plurality of cam grooves 73 are formed to be line symmetrical with respect to the center cam groove 72. The cam grooves 73 at the upper side of the cam groove 72 are formed into such a shape to be far away upward from the cam groove 72 toward the downstream side in the flowing direction. The cant grooves 73 at the lower side of the cant groove 72 are formed into such a shape to be far away downward from the cam groove 72 toward the downstream side in the flowing direction.

Each of the cam grooves 72 and 73 has a parallel blowing zone Zp (refer to FIG. 10) and a diffusing blowing zone Zd (refer to FIG. 14 A).

Figure 14B:
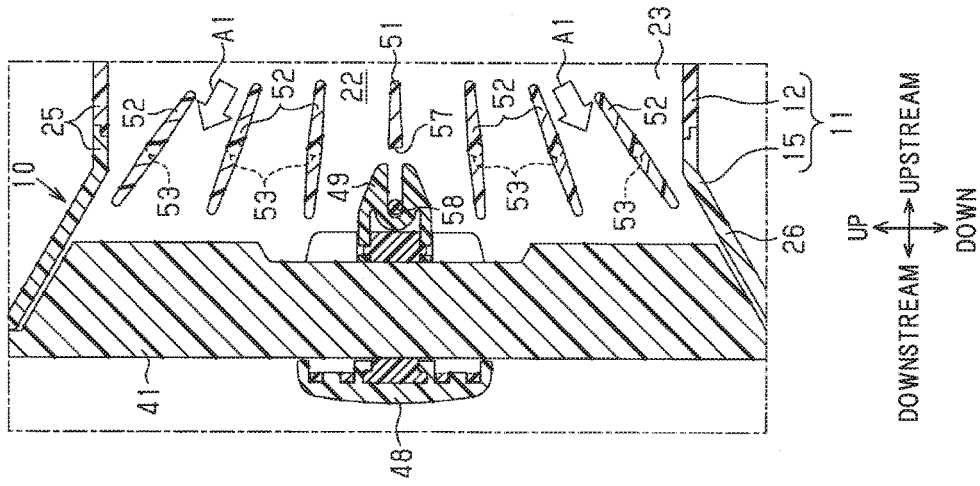
FIGS. 14A and 14B are views showing the air conditioning register in one embodiment in which a diffusion blowing mode is set, where

The parallel blowing zone Z p is a zone for bringing the adjacent upstream fins 51 and 52 into a parallel state (parallel blowing mode) as shown in FIG. 11. The parallel state here includes a strictly parallel relationship, as well as a state close to parallel. As shown in FIG. 14B, the diffusion blowing zone Zd is a zone for bringing the adjacent upstream fins 51 and 52 to a state (diffusion blowing mode) in which the interval between the upstream ends of the upstream fins 51 and 52 is narrower than the interval between the downstream ends.

The parallel blowing zone Zp is set at the downstream part in the flowing direction of each of the cam grooves 72 and 73 (refer to FIG. 10). The diffusion blowing zone Zd is set at the upstream side of the parallel blowing zone Zp of each of the cam grooves 72 and 73 (refer to FIG. 14A).

<Drive Mechanism DM>

Figure 7:
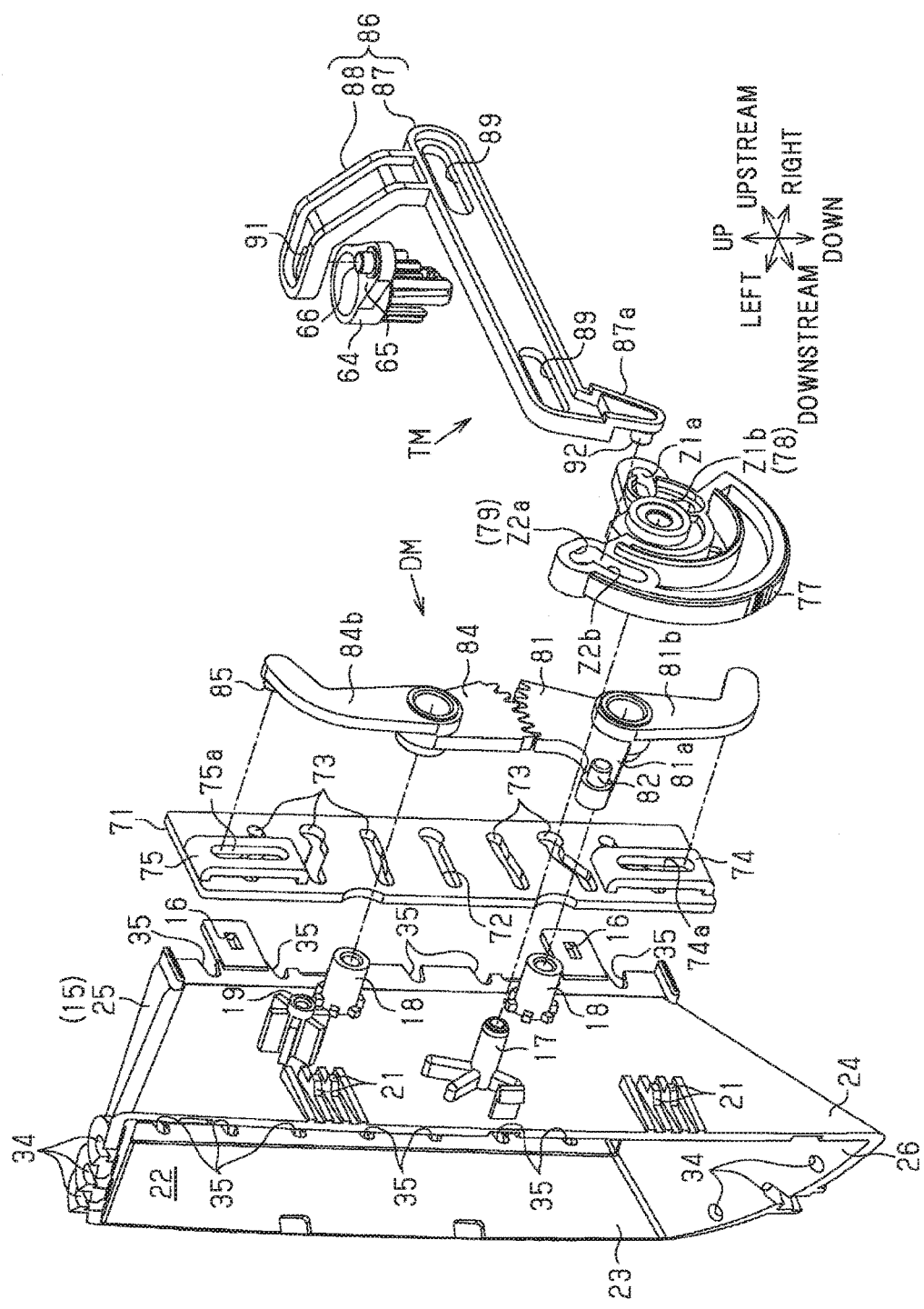
FIG. 7 is an exploded perspective view showing a part of the components of the air conditioning register in FIG. 1.

As shown in FIGS. 7 and 10, the drive mechanism DM includes an operation member 77 and a pair of gears 81 and 84.

The operation member 77 is rotatably supported by the shaft part 17. One of the roles of the operation member 77 is to change the blowing mode of the plurality of upstream fins 51 and 52 between the parallel blowing mode and the diffusion blowing mode by changing the position of the connecting plate 71 in the flowing direction. A part of the operation member 77 is exposed to the downstream side from the window 33 of the bezel 27 (see FIGS. 1 and 2).

The two gears 81 and 84 are disposed in a state of being aligned in the vertical direction, and are rotatably supported by the shaft part 18. The two gears 81, 84 are engaged with each other.

The lower gear 81 is formed with an extension part 81a extending toward the downstream side in the flowing direction, and a first transmission shaft 82 is provided at the extended end of the extension part 81a. The first transmission shaft 82 is positioned at a position deviated from both the rotation center (the shaft part 18) of the gear 81 and a guiding projection 83 to be described later.

The operation member 77 is provided with a first engaged part 78 with which the first transmission shaft 82 is engaged at a position deviated from the rotation center (shaft part 17) of the operation member 77. The first engaged part 78 is formed of an elongated hole, and has a first transmission zone Z1a for transmitting the rotation of the operation member 77 to the first transmission shaft 82, and a first non-transmission zone Z1b not transmitting. The first non-transmission zone Z1b is formed into an arc shape with the shaft part 17 as a center. The first transmission zone Z1a extends from the upstream end of the first non-transmission zone Z1b in the substantially radially outward direction of the operation member 77.

The zone where the first transmission shaft 82 is positioned in the first transmission zone Z1a when the blowing mode is the parallel blowing mode is connected to the first non-transmission zone through the zone where the first transmission shaft 82 is positioned in the diffusion blowing mode.

The drive mechanism DM is provided with an allowing part. The allowing part allows the connecting plate 71 to move in the vertical direction while maintaining the zone where the connecting pins 56 are positioned in the parallel blowing zone Zp in the cam grooves 72 and 73, when the operation of tilting the upstream fins 51 and 52 around the fin shafts 53 as the fulcrum is performed by the operation knob 48, and only when the respective connection pins 52 are in the parallel blowing zone Zp.

More specifically, a guiding plate part 74 is provided at the lower part of the right side surface of the connecting plate 71. The guiding plate part 74 has a guiding hole 74a extending in the vertical direction. Similarly, a guiding plate part 75 is provided at the upper pail of the right side surface of the connecting plate 71. The guiding plate part 75 has a guiding hole 75a extending in the vertical direction.

The upper gear 84 is formed with a lever 84b which extends substantially upward from the rotation center (shaft part 18) of the upper gear 84. A guiding projection 85 is provided at the extended end of the lever 84b, and the guiding projection 85 is engaged with the upper guiding hole 75a. The lower gear 81 is formed with a lever 81b which extends substantially downward from the rotation center (shaft part 18) of the lower gear 81. A guiding projection 83 is provided at the extended end of the lever 81b, and the guiding projection 83 is engaged with the lower guiding hole 74a.

The two guiding holes 75a and 74a and the two guiding projections 85 and 83 form the allowing part. The allowing part regulates the connecting plate 71 from moving in the vertical direction, only when the blowing mode is set to the diffusion blowing mode by the operation member 77, by positioning the two guiding projections 85 and 83 at positions most distant from the other guiding hole 74a/75a in the guiding hole 75a/74a.

<Transmission Mechanism TM>

The transmission mechanism TM is a mechanism for transmitting the rotation of the operation member 77 to the damper shaft 64 of the shut damper 61 and blocking the transmission, and is provided between the operation member 77 and the damper shaft 64. The transmission mechanism TM includes a link member 86 arranged to be movable in the flowing direction. The link member 86 includes a main body link part 87 extending in the flowing direction, and a branch link part 88 extending from the upstream part of the main body link part 87 substantially obliquely upward and leftward. In the main body link part 87, guiding holes 89 extending in the same direction respectively are formed at two positions separated from each other in the flowing direction. The corresponding guiding pins 14 and 19 are engaged with the guiding holes 89. The two guiding pins 14 and 19 have a function of allowing the main body link part 87 to move in the flowing direction, but regulating the movement in other directions. When the expression is changed, the two guiding pins 14 and 19 and the two guiding holes 89 have a function of guiding the movement of the main body link part 87 in the flowing direction.

Figure 15:
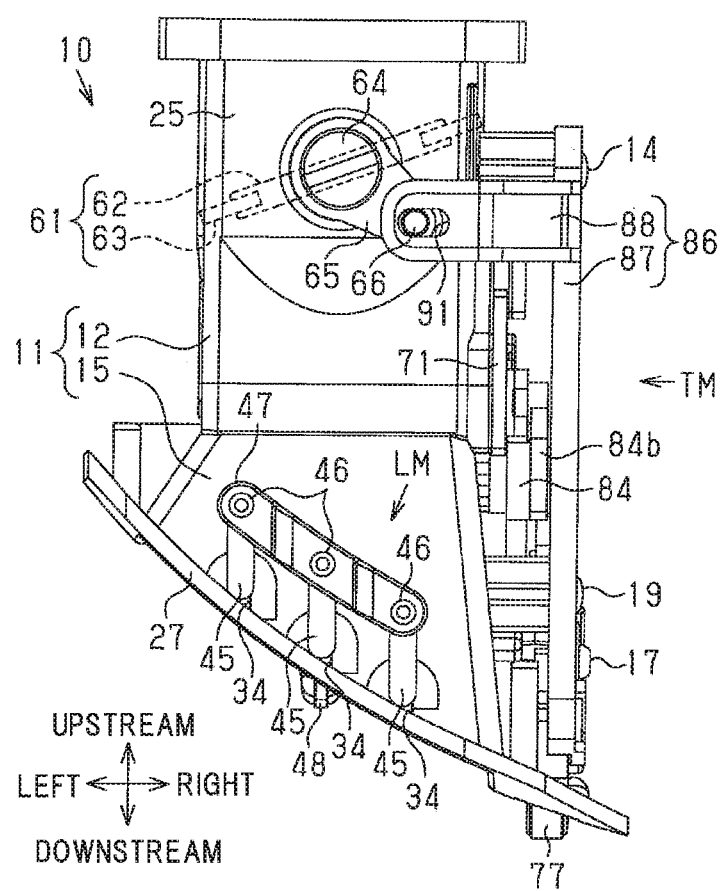
FIG. 15 is a top view of an air conditioning register in one embodiment in which the opening degree of the air passage is minimized by a shut damper.

A transmission hole 91 extending in the lateral direction is formed at the extended end of the branch link part 88 (refer to FIGS. 3 and 15). The transmission shaft part 66 of the damper shaft 64 is engaged with the transmission hole 91. By this engagement, the upstream end of the link member 86 is connected to a position deviated from the rotation center of the damper shaft 64.

The downstream end of the main body link part 87 has an extending part 87a extending obliquely downward toward the downstream side. A second transmission shaft 92 extending to the left is provided at the lower end of the extending part 87a, that is, at the downstream end of the main body link part 87.

In the operation member 77, a second engaged part 79 with which the second transmission shaft 92 is engaged are provided at a position deviated from both the rotation center (the shaft part 17) and the first engaged part 78. The second engaged part 79 is formed of an elongated hole, and has a second transmission zone Z2a for transmitting the rotation of the operation member 77 to the second transmission shaft 92 and a second non-transmission zone Z2b not transmitting. The second non-transmission zone Z2b is formed into an arc shape with the shaft part 17 as a center. The second transmission zone Z2a extends outward in the substantially radial direction of the operation member 77 from the upstream end of the second non-transmission zone Z2b.

The zone where the second transmission shaft 92 is positioned in the second transmission zone Z2a when the opening degree of the air passage 22 is the minimum due to the shut damper 61 is connected to the second non-transmission zone Z2b through the zone where the second transmission shaft 92 is positioned when the opening degree is the maximum.

In the present embodiment, the position of the first transmission shaft 82 in the first engaged part 78 and the position of the second transmission shaft 92 in the second engaged part 79 are set to satisfy the following conditions.

Condition 1: when the first transmission shaft 82 is positioned in the first transmission zone Z1a, the second transmission shaft 92 is positioned in the second non-transmission zone Z2b (FIG. 10, etc.).

Figure 14A:
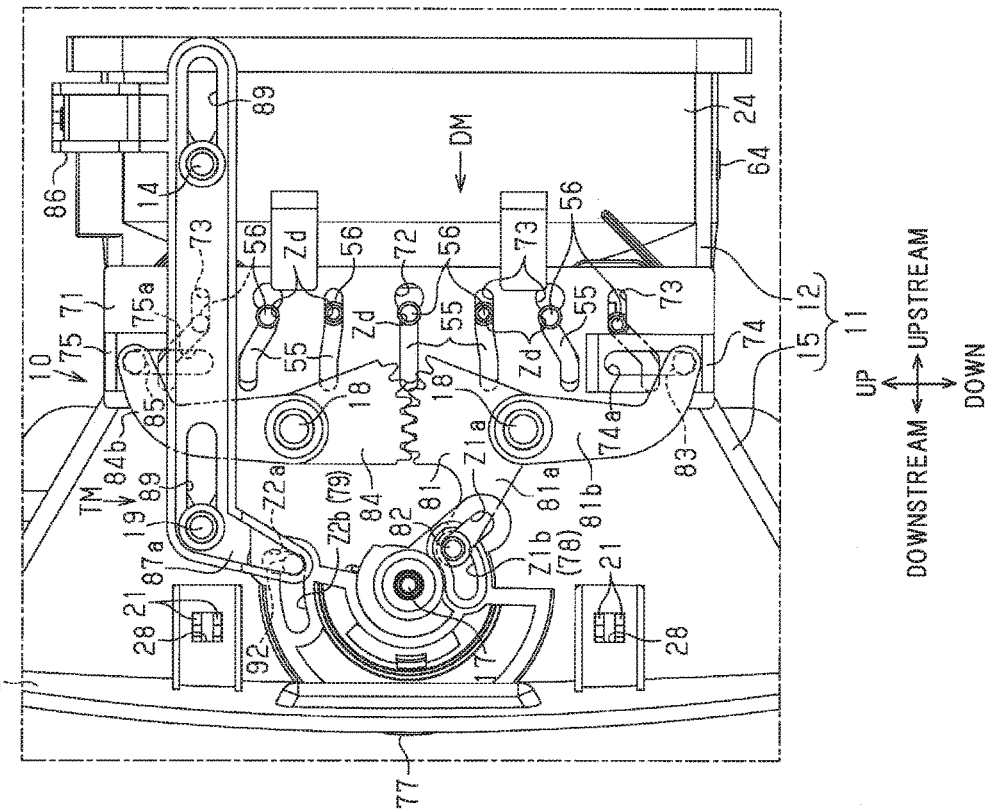

Condition 2: when the first transmission shaft 82 is positioned in the first non-transmission zone Z1b, the second transmission shaft 92 is positioned in the second transmission zone Z2a (FIG. 14A).

The air conditioning register of the present embodiment is formed as described above. Next, the operation of this air conditioning register will be described.

Figure 9:
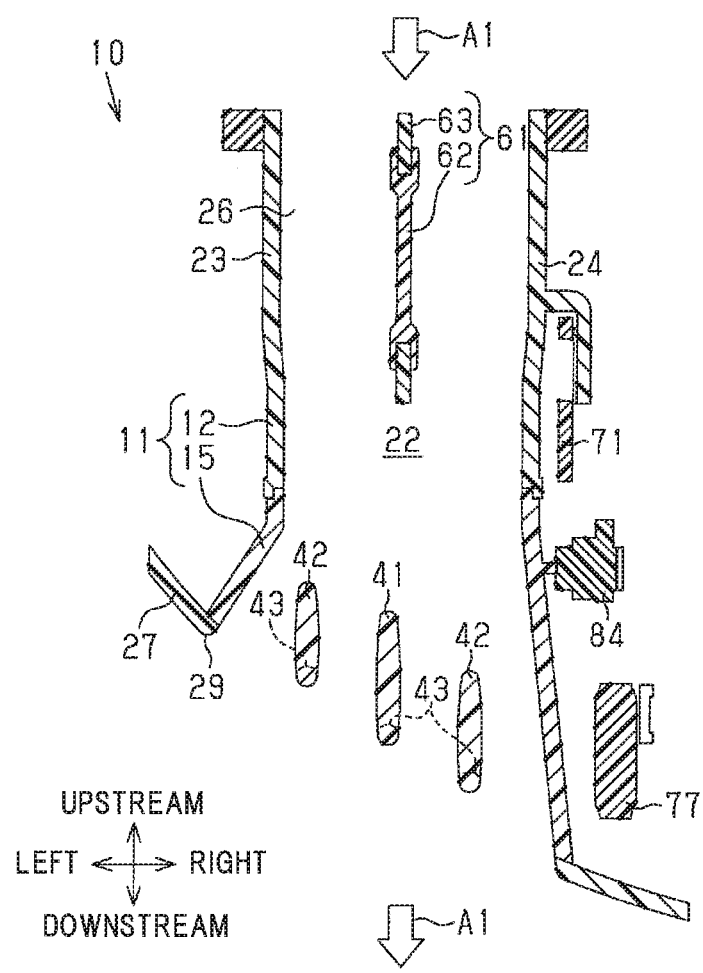
FIG. 9 is a cross-sectional view taken along the line 9-9 of FIG. 2.

FIGS. 8 and 9 show that all the downstream fins 41 and 42 are substantially parallel to the left and right side walls 23 and 24 of the upstream retainer 12. This state is a neutral state of the downstream fins 41 and 42.

The air conditioning air A1 is blown out straight from the blowout port 29 to the center part in the lateral direction by flowing in mutually parallel state between the adjacent downstream fins 41 and 42 and the like toward the direction along these downstream fins 41 and 42.

Here, "between the adjacent downstream fins 41 and 42 and the like" includes not only between the adjacent downstream fins 41 and 42, but also between the left end downstream fin 42 and the left side wall 23 and between the right end downstream fin 42 and the right side wall 24.

On the other hand, when a force directed to the left or right is applied to the operation knob 48, the operation knob 48 is tilted together with the downstream fin 41 in the direction to which the force is applied with the fin shaft 43 as a fulcrum. This tilting is transmitted to the two downstream fins 42 through the link mechanism LM (refer to FIG. 11). Due to this transmission, the two downstream fins 42 tilt to the side on which the operation knob 48 is operated in synchronization with the central downstream fin 41. The air conditioning air A1 flows along the downstream fins 41 and 42 tilted as described above so that the direction is changed, and blows out obliquely rightward or obliquely leftward from the blowout port 29.

In the following description, it is assumed that the downstream fins 41, 42 are in a neutral state. FIG. 10 shows the state of each component when the operation member 77 is positioned at one end of the rotatable zone (movable zone). At this time, the first transmission shaft 82 is positioned at a position (upstream end) furthest away from the first non-transmission zone Z1b in the first transmission zone Z1a of the first engaged part 78. The second transmission shaft 92 is positioned at a position (downstream end) farthest from the second transmission zone Z2a, in the second non-transmission zone Z2b.

As shown in FIG. 8, the shut damper 61 is in a state of being substantially parallel to the left and right side walls 23 and 24 of the upstream retainer 12, and the opening degree of the air passage 22 is the maximum (fully open state). Therefore, the air conditioning air A1 flowing into the retainer main body 11 flows separately on the left side and the right side of the shut damper 61.

At this time, as shown in FIG. 11, the operation knob 48 is positioned at the center portion of the movable zone in the vertical direction.

Here, the upstream fins 51 and 52 are tillable with the fits shaft 53 as a fulcrum. The tilting of the central upstream fin 51 is determined by the position of the connecting pin 56 in the central cam groove 72 forming a straight line. In addition, the tilting of each of the plurality of upstream fins 52 is determined by the position of the connecting pin 56 in the corresponding cam groove 73.

As shown in FIGS. 10 and 11, the connecting pin 56 for each of the upstream fins 51 and 52 is positioned in the parallel blowing zone Zp set at the downstream part in the flowing direction in the cam grooves 72 and 73.

For the upstream fins 51 and 52, all the upstream fins 51 and 52 whose connecting pins 56 are positioned at the same height as the fin shaft 53 are substantially parallel to the upper wall 25 and the bottom wall 26 of the upstream retainer 12.

Therefore, the air conditioning air A1 passing the shut damper 61 is blown out straight from the blowout port 29 to the center part in the vertical direction by flowing in mutually parallel state between the adjacent downstream fins 51 and 52 and the like toward the direction along these downstream fins 51 and 52.

Here, "between the upstream fins 51 and 52 and the like" includes not only between the adjacent upstream fins 51, 52, but also between the upstream fin 52 and the upper wall 25 at the upper end, and between the upstream fin 52 and the bottom wall 26 at the lower end.

At this time, both the upper and lower guiding projections 85 and 83 are positioned in the center portion in the vertical direction of the corresponding guiding holes 75a and 74a. Temporarily, when the upper guiding projection 85 is positioned at the upper end of the upper guiding hole 75a and the lower guiding projection 83 is positioned at the lower end of the lower guiding hole 74a, the upward and downward movement of the connecting plate 71 is regulated by the two guiding projections 85 and 83. However, when at least one of the guiding projections 85 and 83 is positioned at a position other than the above of the guiding holes 75a and 74a, such a movement is not regulated. As described above, when the guiding projections 85 and 83 are positioned at the center portions of the guiding holes 75a and 74a, the connecting plate 71 is allowed to move both upward and downward.

Figure 12B:
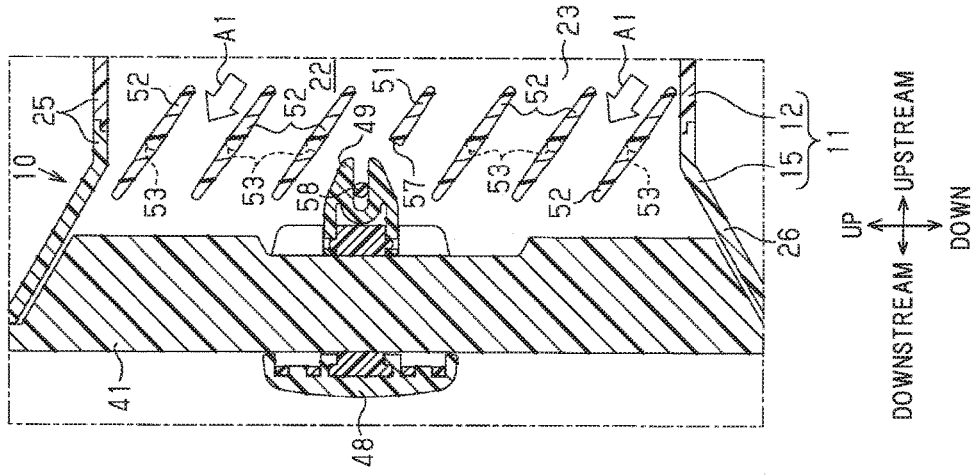
FIGS. 12A and 12B are views showing the air conditioning register in one embodiment tilted in such a manner that a parallel blowing mode is set and the upstream fin goes higher toward the downstream side, where
Figure 12A:
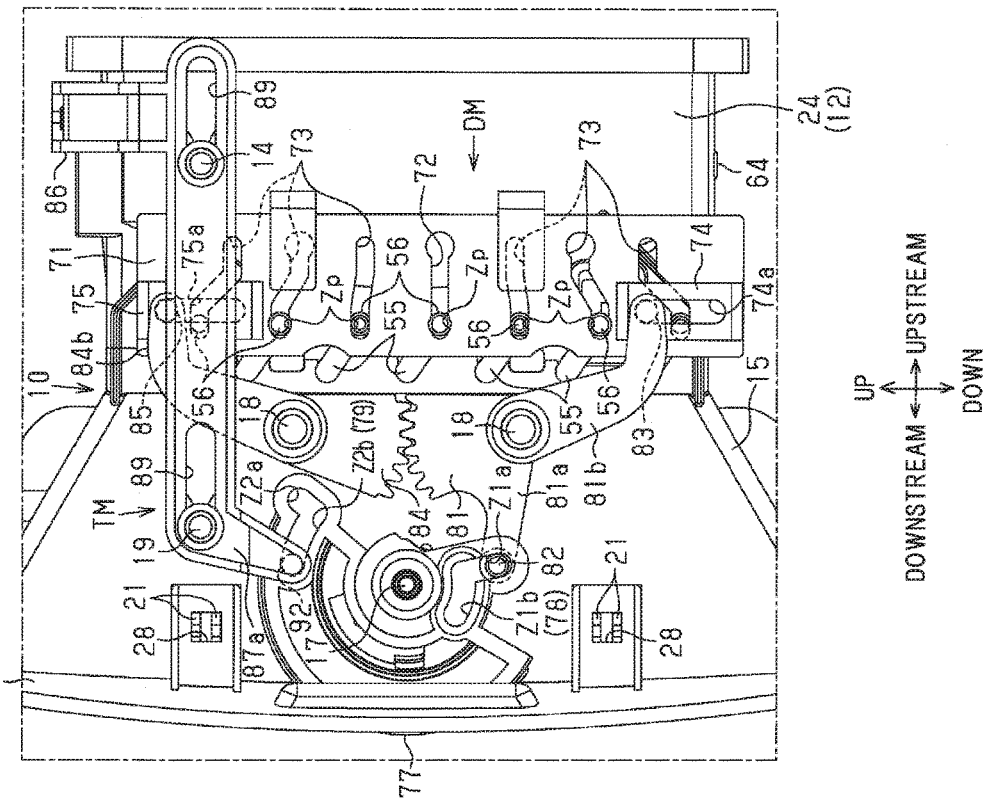

Thus, from the state of FIG. 10, in order to tilt the upstream fins 51 and 52 around the fin shafts 53 as a fulcrum, when a force is applied to the operation knob 48 in the vertical direction, for example, upward, the force is transmitted to the central upstream fin 51 through the fork part 49 and the transmission shaft part 58. The upstream fin 51 is tilted around the fin shaft 53 as a fulcrum so that the downstream side becomes higher. Further, a downward force is applied to the connecting plate 71 through the arm 55, the connecting pin 56, and the cam move 72 of the upstream fin 51. As shown in FIGS. 12A and 12B, the positions of the guiding projections 85 and 83 in the guiding holes 75a and 74a are changed upward so that the position of each connecting pin 56 in each of the cam grooves 72 and 73 is parallel moved downward while maintaining the posture in which the connecting plate 71 extends in the vertical direction while being held in the parallel blowing zone Zp. With this movement, the connecting pin 56 of each of the upstream fins 51 and 52 moves to a position lower than the fin shaft 53. The upstream fins 51 and 52, while parallel to each other, are tilted so that the downstream sides become higher, and the direction of the air conditioning air A1 blown out in parallel is changed from horizontal to upward.

Figure 13B:
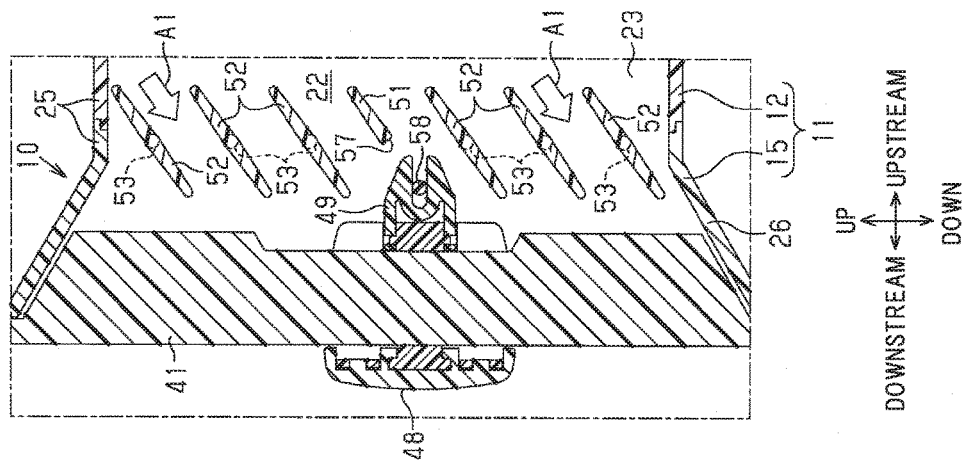
FIGS. 13A and 13B are views showing the air conditioning register in one embodiment tilted in such a manner that the parallel blowing mode is set and the upstream fin goes lower toward the downstream side, where
Figure 13A:
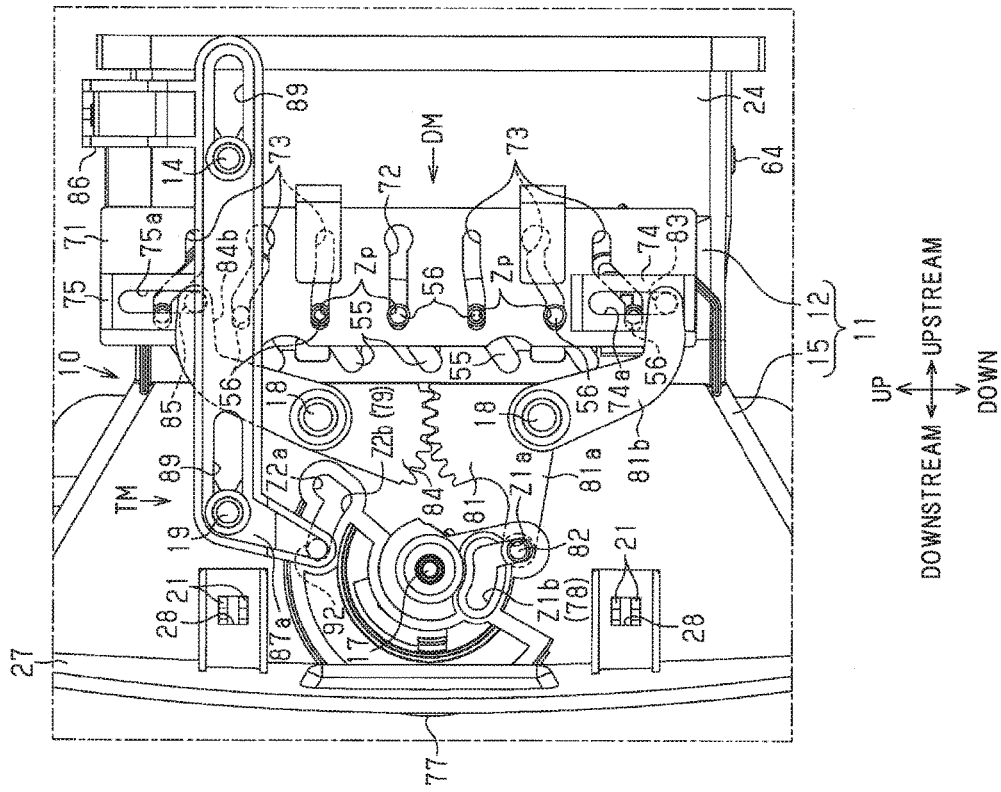

On the contrary to the above, from the state of FIG. 10, when a downward force is applied to the operation knob 48, as shown in FIGS. 13A and 13B, the components act to the directions opposite to the case the upward force is applied. The positions of the guiding projections 85 and 83 in the guiding holes 75a and 74a are changed downward so that the position of each connecting pin 56 in each of the cam grooves 72 and 73 is parallel moved upward while maintaining the posture in which the connecting plate 71 extends in the vertical direction while being held in the parallel blowing zone Zp. Along with this movement, the connecting pin 56 of each of the upstream fins 51 and 52 moves to a position higher than the fin shaft 53. The upstream fins 51 and 52, while parallel to each other, are tilted so that the downstream sides become lower, and the direction of the air conditioning air A1 blown out in parallel is changed from horizontal to downward.

On the other hand, from the state of FIG. 10, when a downward force is applied to the operation member 77 and the operation member 77 is rotated in the same direction, the first engaged part 78 and the second engaged part 79 pivots around the rotation center (shaft part 17) of the operation member 77 in the counterclockwise direction in FIG. 10. By this pivoting, as shown in FIGS. 14A and 14B, the position of the first transmission shaft 82 in the first engaged part 78 and the position of the second transmission shaft 92 in the second engaged part 79 change. The first transmission shaft 82 moves from a position (upstream end) away from the first non-transmission zone Z1b in the first transmission zone Z1a to a position (downstream end) adjacent to the first non-transmission zone Z1b. Further, the second transmission shaft 92 moves from a position (downstream end) away from the second transmission zone Z2a in the second non-transmission zone Z2b to a position (upstream end) adjacent to the second transmission zone Z2a.

The rotation of the operation member 77 is transmitted to the lower gear 81 through the first engaged part 78 and the first transmission shaft 82 and the same gear 81 is rotated in the clockwise direction. Along with this rotation, the guiding projection 83 turns in the clockwise direction around the rotation center (the shaft part 18) of the gear 81. Along with this turning, the guiding projection 83 moves downward along the guiding hole 74a.

As the lower gear 81 rotates, the position where the upper gear 84 meshes with the same gear 81 changes, and the upper gear 84 rotates counterclockwise in the direction opposite to the lower gear 81. Along with this rotation, the guiding projection 85 pivots counterclockwise around the rotation center (shaft part 18) of the gear 84. Along with this pivoting, the guiding projection 85 moves upward along the guiding hole 75a.

As a result of the movement of the two guiding projections 85, 83, the two guiding projections 85, 83 are separated from each other in the vertical direction.

In addition, due to the pivoting of the guiding projections 85, 83, a force toward the downstream side is transmitted to the connecting plate 71 through the guiding holes 75a and 74a and the guiding plate parts 75 and 74, and the connecting plate 71 moves to the downstream side. Along with this movement, the cam grooves 72 and 73 move in parallel in the same direction. The zone where the connecting pin 56 is positioned in each of the cam grooves 72 and 73 changes from the parallel blowing zone Zp to the diffusion blowing zone Zd upstream from the parallel blowing zone Zp.

As described above, the cam groove 72 has a linear shape extending in the flowing direction of the air conditioning air A1. The cam grooves 73 on the upper side of the cam groove 72 are formed into such a shape to be far away upward from the cam groove 72 toward the downstream side in the flowing direction. The cam grooves 73 on the lower side of the cam groove 72 are formed into such a shape to be far away downward from the cam groove 72 toward the downstream side in the flowing direction.

Therefore, as described above, when the zone where the connecting pin 56 is positioned changes, the central upstream fin 51 maintains a horizontal state (substantially parallel to the upper wall 25 and the bottom wall 26 of the upstream retainer 12). The upstream fins 52 which are line-symmetrical with each other across the central upstream fin 51 are inclined in opposite directions. The upstream fins 52 above the central upstream fin 51 are inclined to become higher toward the downstream side, and the upstream fins 52 below the central upstream fin 51 are inclined to become lower toward the downstream side. In addition, the farther the plurality of upstream fins 52 are from the upstream fin 51, the larger the inclination.

In this manner, the adjacent upstream fins 51 and 52 are tilted so that the interval between the upstream ends of the adjacent upstream fins 51 and 52 becomes narrower than the interval between the downstream ends.

The air conditioning air A1 flows between the adjacent upstream fins 51 and 52 and the like along the same upstream fins 51 and 52 and the like to blow out in the diffusion blowing mode from the blowout port 29. The air conditioning air A1 blown out is diffused to spread to a wider area at the downstream side. A weaker air conditioning air A1 is blown to a wider site of the occupant than when the parallel blowing mode is selected as the blowing mode.

In the diffusion blowing mode, the upper guiding projection 85 reaches the upper end of the upper guiding hole 75a, and the lower guiding projection 83 reaches the lower end of the lower guiding hole 74a. In this way, in the diffusive blowing mode, the two guiding projections 85 and 83 are the most distant from each other, and are positioned at positions, most distant from the other guiding holes 74a/75a, of the guiding holes 75a/74a. The movement of the connecting plate 21 in the vertical direction which is the extending direction of the guiding holes 75a and 74a is regulated by the two guiding projections 85 and 83.

Accordingly, because the upstream fins 51 and 52 are tilted with the fin shafts 53 as a fulcrum, even if an operation of sliding the operation knob 48 in the vertical direction is performed, the connecting pins 56 are maintained in the diffusion blowing zone Zd of the cam grooves 72 and 73, and the connecting plate 71 is not allowed to move in the vertical direction. The adjacent upstream fins 51 and 52 can not tilt while maintaining that the interval between the upstream ends is narrower than the interval between the downstream ends, and the direction of the diffused air conditioning air A1 is not changed.

Therefore, as compared with the case where the upstream fins 51, 52 are tilted while maintaining the diffusion blowing mode, among the plurality of upstream fins 51 and 52 set in the diffusion blowing mode, the upstream fins 52 positioned at the upper end can be brought close to the upper wall 25 of the retainer main body 11 and the upstream fins 52 positioned at the lower end can be brought close to the bottom wall 26. With these closings, the range of the diffused air conditioning air A1 can be wider than when the upstream fins 51 and 52 are tilted while maintaining the diffusion blowing mode.

At this time, the rotation of the operation member 77 is not transmitted to the second transmission shaft 92. The link member 86 does not move, the shut damper 61 does not tilt, and the opening degree of the air passage 22 is not adjusted. The opening degree of the air passage 22 remains maximum (fully open state) that can be taken.

As shown in FIGS. 14A and 14B, when the operation member 77 is rotated further downward from the state in which the blowing mode is switched to the diffusion blowing mode, along with this, the first engaged part 78 pivots counterclockwise around the rotation center (shaft part 17) of the operation member 77, so that the first transmission shaft 82 moves from the first transmission zone Z1a to the first non-transmission zone Z1b. The first transmission shaft 82 moves away from the first transmission zone Z1a in the first non-transmission zone Z1b toward the downstream side as the downward rotation amount of the operation member 77 increases. In addition, as the operation member 77 rotates downward, the second engaged part 79 pivots counterclockwise around the rotation center (shaft part 17) of the operation member 77, so that the second transmission shaft 92 moves from a position (downstream end) adjacent to the second non-transmission zone Z2b in the second transmission zone Z2a to a position (upstream end) away from the second non-transmission zone Z2b.

The second transmission shaft 92 at the downstream end of the link member 86 pivots counterclockwise around the rotation center (shaft part 17) of the operation member 77, and the link member 86 moves in parallel to the downstream side. Accordingly, the upstream end of the link member 86 moves to the downstream side. The shut damper 61 is tilted in a direction to reduce the opening degree of the air passage 22 with the damper shaft 64 as a fulcrum. Therefore, the momentum of the air conditioning air A1 blown out from the blowout port 29 can be gradually weakened (steplessly) according to the rotation operation of the operation member 77.

When the second transmission shaft 92 reaches the position (the upstream end) most distant from the second non-transmission zone Z2b in the second transmission zone Z2a, the shut damper 61 tilts to the position indicated by the broken lines in FIG. 15. The sealing member 63 comes into contact with the two side walls 23 and 24 in addition to the upper wall 25 and the bottom wall 26. The opening degree of the air passage 22 is minimized so that the air conditioning air A1 is prevented from flowing to the downstream side of the shut damper 61, and the blowing out of the air conditioning air A1 from the blowout port 29 is blocked.

When the operation member 77 is rotated in the opposite direction (upward) from the above state in which the opening degree of the air passage 22 is the minimum, the shut damper 61 is tilted in a direction to increase the opening degree of the air passage 22. When the operation member 77 is further rotated in the above direction from the state where the opening degree is the maximum, the blowing mode is switched from the diffusion blowing mode to the parallel blowing mode. Accordingly, the momentum of the air conditioning air A1 blown out from the blow-out port 29 can be gradually (steplessly) strengthened in accordance with the operation of the operation member 77.

As described above, when the blowing mode is switched from the diffusion blowing mode to the parallel blowing mode, the first transmission shaft 82 moves from a position (downstream end) adjacent to the first non-transmission zone Z1b in the first transmission zone Z1a to a position (upstream end) away. In addition, the second transmission shaft 92 moves from a position (upstream end) adjacent to the first transmission zone Z1a in the second non-transmission zone Z2b to a position (downstream end) away from the first transmission zone Z1a.

In this way, in addition to switch the blowing mode and to allow the change of the blowing direction of the air conditioning air A1 in the parallel blowing mode, by rotating the single operation member 77, it is possible to adjust the opening degree of the air passage 22 by driving the shut damper 61.

The above embodiment can also be implemented as a modified example modified as follows.

The first engaged part 78 and the second engaged part 79 may be formed of grooves that do not penetrate but have a bottom instead of the elongated holes that penetrate the operation member 77.

The cam grooves 72 and 73 may penetrate in the thickness direction of the connecting plate 71, or may have a bottom without penetration.

The guiding holes 75a and 74a may penetrate in the thickness direction of the guiding plate parts 75 and 74 or may have a bottom without penetration.

In place of the upstream fins 51 and 52, the downstream fins 41 and 42 may be made to be fins to which the parallel blowing mode and the diffusion blowing mode are set.

The shut damper 61 may be tilted to be changed by operating a member different from the operation member 77.

The air conditioning register can also be applied to an air conditioning register provided in a different position from the instrument panel in the passenger compartment.

The air conditioning register is applicable not only to vehicles but also widely as long as the direction of the air conditioning air A1 sent from the air conditioner and blown into the room can be adjusted by the fins.

The air conditioning register can also be applied to an air conditioning register in which the blowout port 29 is arranged horizontally. In this case, the downstream fins 41 and 42 are used to extend in the lateral direction, respectively, and are arranged in the vertical direction. The plurality of upstream fins 51 and 52 are used to extend in the vertical direction, respectively, and are arranged to be separated from each other in the lateral direction.

The air conditioning register can also be applied to an air conditioning register in which the blowout port 29 has a square shape or a shape close to a square shape.

What is claimed is:

1. An air conditioning register, comprising:
   a retainer which is formed with an air passage having a blowout port at a downstream end in a flowing direction of air conditioning air;
   a plurality of fins arranged in a direction intersecting with the flowing direction in the air passage, tiltably supported in the retainer respectively by fin shafts, and having connecting pins respectively at positions deviated from the fin shafts;
   a connecting plate configured to connect the plurality of fins at the connecting pins;
   a drive mechanism configured to change a position of the connecting plate in the flowing direction, wherein:
   the connecting pins of the fins are engaged with cam grooves provided in the connecting plate so that all the fins are connected to the connecting plate;
   each of the cam grooves has a parallel blowing zone for bring adjacent fins into a parallel blowing mode in which the adjacent fins are parallel to each other, and has a diffusion blowing zone for bringing adjacent fins into a diffusion blowing mode in which the interval between upstream ends of the adjacent fins is narrower than the interval between downstream ends; and
   the drive mechanism is provided with an allowing part which allows the connecting plate to move in the arrangement direction of the fins when an operation of tilting the fins is performed with the fin shafts as a fulcrum, while maintaining where each connecting pin is positioned in each of the cam grooves in the parallel blowing zone when each connecting pin is in the parallel blowing zone,
   the drive mechanism includes: an operation knob configured to change a blowing mode of the plurality of fins between the parallel blowing mode and the diffusion blowing mode by changing a position of the connecting plate in the flowing direction; and a pair of gears arranged along the arrangement direction of the fins, meshing with each other and rotating in opposite directions in accordance with the operation of the operation knob,
   the allowing part includes: a pair of guiding holes respectively extending in the arrangement direction of the fins in the connecting plate; and a pair of guiding projections provided at positions deviated from rotation centers of the gears and engaged with the guiding holes, and
   the allowing part regulates the connecting plate from moving in the arranging direction of the fins, only when the plurality of fins are brought into the diffusion blowing mode by the operation knob, by positioning both the guiding projections in the position most distant from the other guiding hole in the guiding holes.

2. The air conditioning register according to claim 1, wherein:
   the operation knob is rotatably supported by the retainer;
   in one of the gears, a transmission shaft is provided at a position deviated from both the rotation center of the gear and the guiding projection;
   the operation knob includes an engaged part to which the transmission shaft is engaged the engaged part of the operation knob is provided at a position deviated from a rotation center of the operation knob; and
   the switching of the blowing mode between the parallel blowing mode and the diffusion blowing mode is performed by transmitting the rotation of the operation knob to the one gear through the engaged part and the transmission shaft.

3. The air conditioning register according to claim 2, wherein:
   in the retainer, a shut damper configured to adjust the opening degree of the air passage is tiltably supported by a damper shaft; and
   a transmission mechanism configured to transmit the rotation of the operation knob to the damper shaft is provided between the operation knob and the damper shaft.

4. The air conditioning register according to claim 3, wherein:
   the transmission mechanism includes a link member arranged to be movable in the flowing direction;
   an upstream end of the link member is connected to a position deviated from the rotation center of the damper shaft; and
   a downstream end of the link member is connected to a position deviated from both the rotation center of the operation knob and the engaged part.

5. The air conditioning register according to claim 4, wherein when the transmission shaft of the gear is a first transmission shaft and the engaged part to which the first transmission shaft is engaged in the operation knob is a first engaged part, a second transmission shaft is provided at a downstream end of the link member, a second engaged part to which the second transmission shaft is engaged is provided at a position deviated from both the rotation center of the operation knob and the first engaged part of the operation knob, the first engaged part is formed of a groove part or an elongated hole, and has a first transmission zone for transmitting the rotation of the operation knob to the first transmission shaft and a first non-transmission zone not transmitting, the second engaged part is formed of a groove part or an elongated hole, and has a second transmission zone for transmitting the rotation of the operation knob to the second transmission shaft and a second non-transmission zone not transmitting, and the second transmission shaft is positioned in the second non-transmission zone when the first transmission shaft is positioned in the first transmission zone, and is positioned in the second transmission zone when the first transmission shaft is positioned in the first non-transmission zone.

6. The air conditioning register according to claim 5, wherein:

a first zone where the first transmission shaft is positioned in the first transmission zone when the blowing mode is the parallel blowing mode is connected to the first non-transmission zone through a second zone where the first transmission shaft is positioned in the diffusion blowing mode; and a third zone where the second transmission shaft is positioned in the second transmission zone when the opening degree of the air passage is the minimum is connected to the second non-transmission zone through a fourth zone where the second transmission shaft is positioned when the opening degree is the maximum.

* * * * *